US006096375A

United States Patent [19]
Ouderkirk et al.

[11] Patent Number: 6,096,375
[45] Date of Patent: Aug. 1, 2000

[54] OPTICAL POLARIZER

[75] Inventors: Andrew J. Ouderkirk, Woodbury; Michael F. Weber, Shoreview, both of Minn.; James M. Jonza, Round Rock, Tex.; Carl A. Stover, St. Paul, Minn.

[73] Assignee: 3M Innovative Properties Company, St. Paul, Minn.

[21] Appl. No.: 09/251,081

[22] Filed: Feb. 16, 1999

Related U.S. Application Data

[62] Division of application No. 09/013,819, Jan. 27, 1998, which is a continuation of application No. 08/402,042, Mar. 10, 1995, abandoned, which is a continuation-in-part of application No. 08/171,239, Dec. 21, 1993, abandoned, which is a continuation-in-part of application No. 08/171,098, Dec. 21, 1993, abandoned, and a continuation-in-part of application No. 08/359,436, Dec. 20, 1994, abandoned, and a continuation-in-part of application No. 08/360,215, Dec. 20, 1994, abandoned.

[51] Int. Cl.[7] ........................................... B05D 5/06
[52] U.S. Cl. ..................... 427/163.1; 359/485; 359/490; 359/491; 359/494; 359/508; 427/164; 427/171; 427/172; 427/173
[58] Field of Search ................................ 427/163.1, 164, 427/407.1, 171–173; 359/485, 490, 491, 494, 500

[56] References Cited

U.S. PATENT DOCUMENTS

| Re. 34,605 | 5/1994 | Schrenk et al. | 359/359 |
|---|---|---|---|
| 1,610,423 | 12/1926 | Cawley | 353/20 |
| 2,492,809 | 12/1949 | Marks | 88/65 |
| 2,776,598 | 1/1957 | Dreyer | 88/105 |
| 2,887,566 | 5/1959 | Marks | 240/5.9 |
| 3,124,639 | 3/1964 | Kahn | 88/65 |
| 3,213,753 | 10/1965 | Rogers | 88/65 |
| 3,423,498 | 1/1969 | Lefevre | 264/171 |
| 3,480,502 | 11/1969 | Schrenk | 156/271 |
| 3,498,873 | 3/1970 | Schrenk | 161/109 |
| 3,528,723 | 9/1970 | Rogers | 350/157 |
| 3,556,635 | 1/1971 | Schrenk et al. | 350/96 |
| 3,565,985 | 2/1971 | Schrenk et al. | 264/171 |
| 3,600,587 | 8/1971 | Smith | 250/199 |
| 3,610,729 | 10/1971 | Rogers | 350/157 |
| 3,647,612 | 3/1972 | Schrenk et al. | 161/165 |
| 3,711,176 | 1/1973 | Alfrey, Jr. et al. | 350/1 |
| 3,746,485 | 7/1973 | Schrenk | 425/131 |
| 3,759,647 | 9/1973 | Schrenk et al. | 425/131 |
| 3,773,882 | 11/1973 | Schrenk | 264/171 |

(List continued on next page.)

FOREIGN PATENT DOCUMENTS

| 578035 | 6/1959 | Canada . |
|---|---|---|
| 724101 | 12/1965 | Canada . |
| 1200357 | 2/1986 | Canada . |
| 1327286 | 3/1994 | Canada . |
| 218041 | 12/1993 | China ........................... G02F 1/1335 |
| 81108331 | 1/1981 | European Pat. Off. . |
| 062751 | 10/1981 | European Pat. Off. . |
| 056843 | 8/1982 | European Pat. Off. . |
| 138194 | 4/1985 | European Pat. Off. . |
| 269324 | 6/1986 | European Pat. Off. . |
| 228611 | 7/1987 | European Pat. Off. .......... G02B 1/08 |
| 342283 | 11/1989 | European Pat. Off. . |
| 342747 | 11/1989 | European Pat. Off. . |
| 460241 | 12/1990 | European Pat. Off. . |
| 426636 | 5/1991 | European Pat. Off. . |
| 488544 | 11/1991 | European Pat. Off. . |
| 0 460 241 A1 | 12/1991 | European Pat. Off. . |
| 492636 | 12/1991 | European Pat. Off. . |
| 0 469 732 A3 | 2/1992 | European Pat. Off. . |
| 469732 | 2/1992 | European Pat. Off. . |

(List continued on next page.)

OTHER PUBLICATIONS

Bird, G. and M. Parrish, "The Wire Grid as a Near–Infrared Polarizer", Journal of the Optical Society of America, vol. 50, No. 9, pp. 886–891 (1960).
Schrenk et al., Nanolayer polymeric optical films, Tappi Journal, pp. 169–174, Jun., 1992.
Weber, M., "23:3: Retroreflecting Sheet Polarizer", *SID 92 Digest*, p. 427–9 (1993). (no mo).
Weber, M., "P–61: Retroreflecting Sheet Polarizer", SID 93 Digest, p. 669–72 (1993). (no mo).
Land, H., "Some Aspects of the Development of Sheet Polarizers", Optical Society of America, (repr. *Jour. of the Optical Soc. of America*, vol. 4(12) 957–963 (Dec. 1951) p. 45–51.
"The Measurement of Appearance", Hunter et al, John Wiley and Sons, NY, 1987.
"The Use of Multi–Angle Measurements to Characterize the Color of Metallic and Pearlescent Pigments", Presented to The Detroit Color Council Meeting Nov. 15, 1989.
"Thick/Very Thin Polymeric Reflective Material", Dow Report NM 15–08, Jan. 7, 1991.
Selkowitz, S., "Transparent Heat Mirrors for Passive Solar Heating Applications", Lawrence Berkeley Lab report LBL–7829, Univ. of Calif.–Berkeley, p. 1–22 (Mar. 1978).
"Methal Dithiolene Dyes", Nov. 1991.

(List continued on next page.)

*Primary Examiner*—Janyce Bell
*Attorney, Agent, or Firm*—William D. Miller

[57] ABSTRACT

A reflective polarizer and a dichroic polarizer are combined to provide an improved optical polarizer. The dichroic and reflective polarizers are typically in close proximity to each other, and are preferably bonded together to eliminate the air gap between the polarizers. The combination of the two polarizers provides a high reflectivity of one polarization and high transmission for the perpendicular polarization from the reflective polarizer side of the combined polarizer, and high absorption and transmission for light of orthogonal polarization from the dichroic polarizer side. The combination also reduces iridescence as seen in transmission and when viewed in reflection from the dichroic polarizer side. The increased extinction ratio and low reflectivity of the optical polarizer allows use of a lower extinction ratio dichroic polarizer in applications requiring a given extinction ratio and high transmission.

21 Claims, 27 Drawing Sheets

U.S. PATENT DOCUMENTS

| | | | |
|---|---|---|---|
| 3,801,429 | 4/1974 | Schrenk et al. | 161/181 |
| 3,847,585 | 11/1974 | Chisholm | 65/99 A |
| 3,860,036 | 1/1975 | Newman, Jr. | 138/45 |
| 4,025,688 | 5/1977 | Nagy et al. | 428/350 |
| 4,094,947 | 6/1978 | Alfrey, Jr. et al. | 264/171 |
| 4,190,832 | 2/1980 | Mohler | 340/705 |
| 4,268,127 | 5/1981 | Oshima et al. | 350/337 |
| 4,310,584 | 1/1982 | Cooper et al. | 428/212 |
| 4,315,258 | 2/1982 | McKnight et al. | 340/784 |
| 4,427,741 | 1/1984 | Aizawa et al. | 428/332 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,540,623 | 9/1985 | Im et al. | 428/220 |
| 4,542,449 | 9/1985 | Whitehead | 362/330 |
| 4,586,790 | 5/1986 | Umeda et al. | 350/337 |
| 4,590,119 | 5/1986 | Kawakami et al. | 428/216 |
| 4,643,529 | 2/1987 | Hosonuma et al. | 350/337 |
| 4,659,523 | 4/1987 | Rogers et al. | 264/1.3 |
| 4,678,285 | 7/1987 | Ohta et al. | 350/345 |
| 4,720,426 | 1/1988 | Englert et al. | 428/344 |
| 4,756,953 | 7/1988 | Utsumi | 428/220 |
| 4,791,540 | 12/1988 | Dreyer, Jr. et al. | 362/331 |
| 4,796,978 | 1/1989 | Tanaka et al. | 350/337 |
| 4,798,448 | 1/1989 | Van Raalte | 350/345 |
| 4,799,772 | 1/1989 | Utsumi | 350/339 R |
| 4,824,882 | 4/1989 | Nakamura et al. | 524/89 |
| 4,840,463 | 6/1989 | Clark et al. | 350/350 S |
| 4,883,341 | 11/1989 | Whitehead | 350/276 R |
| 4,893,911 | 1/1990 | Ostoja-Starzewski et al. | 350/398 |
| 4,895,769 | 1/1990 | Land et al. | 428/483 |
| 4,896,946 | 1/1990 | Suzuki et al. | 350/334 |
| 4,917,465 | 4/1990 | Conner et al. | 350/335 |
| 4,937,134 | 6/1990 | Schrenk et al. | 428/213 |
| 4,952,023 | 8/1990 | Bradshaw et al. | 350/102 |
| 4,974,946 | 12/1990 | Solomon | 350/399 |
| 4,989,076 | 1/1991 | Owada et al. | 358/61 |
| 5,009,472 | 4/1991 | Morimoto | 350/6.5 |
| 5,042,921 | 8/1991 | Sato et al. | 359/40 |
| 5,051,286 | 9/1991 | Starzewski | 428/500 |
| 5,056,892 | 10/1991 | Cobb, Jr. | 359/831 |
| 5,059,356 | 10/1991 | Nakamura et al. | 252/585 |
| 5,082,601 | 1/1992 | Okada et al. | 252/585 |
| 5,089,318 | 2/1992 | Shetty et al. | 428/212 |
| 5,093,739 | 3/1992 | Aida et al. | 359/73 |
| 5,094,788 | 3/1992 | Schrenk et al. | 264/171 |
| 5,094,793 | 3/1992 | Schrenk et al. | 264/171 |
| 5,095,210 | 3/1992 | Wheatley et al. | 250/339 |
| 5,103,337 | 4/1992 | Schrenk et al. | 359/359 |
| 5,122,905 | 6/1992 | Wheatley et al. | 359/586 |
| 5,122,906 | 6/1992 | Wheatley | 359/586 |
| 5,124,841 | 6/1992 | Oishi | 359/487 |
| 5,126,880 | 6/1992 | Wheatley et al. | 359/587 |
| 5,134,516 | 7/1992 | Lehureau et al. | 350/301 |
| 5,138,474 | 8/1992 | Arakawa | 350/73 |
| 5,139,340 | 8/1992 | Okumura | 359/63 |
| 5,149,578 | 9/1992 | Wheatley et al. | 428/213 |
| 5,157,526 | 10/1992 | Kondo et al. | 359/63 |
| 5,159,478 | 10/1992 | Akiyama et al. | 359/69 |
| 5,166,817 | 11/1992 | Ota et al. | 359/73 |
| 5,188,760 | 2/1993 | Hikmet et al. | 252/299.01 |
| 5,189,538 | 2/1993 | Arakawa | 359/73 |
| 5,194,975 | 3/1993 | Akatsuka et al. | 359/73 |
| 5,200,843 | 4/1993 | Karasawa et al. | 359/40 |
| 5,202,074 | 4/1993 | Schrenk et al. | 264/241 |
| 5,202,950 | 4/1993 | Arego et al. | 385/146 |
| 5,211,878 | 5/1993 | Reiffenrath et al. | 252/299.63 |
| 5,217,794 | 6/1993 | Schrenk | 428/220 |
| 5,221,982 | 6/1993 | Faris | 359/93 |
| 5,233,465 | 8/1993 | Wheatley et al. | 359/359 |
| 5,234,729 | 8/1993 | Wheatley et al. | 428/30 |
| 5,235,443 | 8/1993 | Barnik et al. | 359/37 |
| 5,237,446 | 8/1993 | Takahashi | 350/359 |
| 5,238,738 | 8/1993 | Miller | 428/333 |
| 5,245,456 | 9/1993 | Yoshimi et al. | 359/73 |
| 5,255,029 | 10/1993 | Vogeley et al. | 353/122 |
| 5,258,208 | 11/1993 | Bastiaansen | 428/1 |
| 5,262,894 | 11/1993 | Wheatley et al. | 359/586 |
| 5,269,995 | 12/1993 | Ramanathan et al. | 264/171 |
| 5,278,680 | 1/1994 | Karasawa et al. | 359/40 |
| 5,278,694 | 1/1994 | Wheatley et al. | 359/359 |
| 5,286,418 | 2/1994 | Nakamura et al. | 252/585 |
| 5,294,657 | 3/1994 | Melendy et al. | 524/270 |
| 5,295,018 | 3/1994 | Konuma et al. | 359/487 |
| 5,303,083 | 4/1994 | Blanchard et al. | 359/495 |
| 5,309,422 | 5/1994 | Kuroki et al. | 369/110 |
| 5,312,568 | 5/1994 | Bastiaansen | 264/1.3 |
| 5,316,703 | 5/1994 | Schrenk | 264/1.3 |
| 5,319,478 | 6/1994 | Fijnfschilling et al. | 359/53 |
| 5,325,218 | 6/1994 | Willett et al. | 359/53 |
| 5,333,072 | 7/1994 | Willett | 359/41 |
| 5,337,174 | 8/1994 | Wada et al. | 359/73 |
| 5,339,179 | 8/1994 | Rudisill et al. | 359/49 |
| 5,339,198 | 8/1994 | Wheatly et al. | 359/359 |
| 5,345,146 | 9/1994 | Koenck et al. | 315/169.3 |
| 5,359,691 | 10/1994 | Tai et al. | 385/146 |
| 5,360,659 | 11/1994 | Arends et al. | 428/216 |
| 5,389,324 | 2/1995 | Lewis et al. | 264/171 |
| 5,422,756 | 6/1995 | Weber | 359/487 |
| 5,424,119 | 6/1995 | Phillips et al. | 428/328 |
| 5,448,404 | 9/1995 | Schrenk et al. | 359/584 |
| 5,451,449 | 9/1995 | Shetty et al. | 428/195 |
| 5,486,935 | 1/1996 | Kalmanash | 359/37 |
| 5,486,949 | 1/1996 | Schrenk et al. | 359/498 |
| 5,540,978 | 7/1996 | Schrenk | 428/212 |
| 5,552,927 | 9/1996 | Wheatly et al. | 359/359 |
| 5,559,634 | 9/1996 | Weber | 359/638 |
| 5,568,316 | 10/1996 | Schrenk et al. | 359/584 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

FOREIGN PATENT DOCUMENTS

| | | |
|---|---|---|
| 0 488 544 A1 | 6/1992 | European Pat. Off. . |
| 0 492 636 A1 | 7/1992 | European Pat. Off. . |
| 497506 | 8/1992 | European Pat. Off. . |
| 0 514 223 | 11/1992 | European Pat. Off. . |
| 514223 | 11/1992 | European Pat. Off. . |
| 552725 | 7/1993 | European Pat. Off. . |
| 0 573 905 A1 | 12/1993 | European Pat. Off. . |
| 573905 | 12/1993 | European Pat. Off. . |
| 0 597 261 A1 | 5/1994 | European Pat. Off. . |
| 597261 | 5/1994 | European Pat. Off. . |
| 0 606 939 | 7/1994 | European Pat. Off. . |
| 0 606 940 | 7/1994 | European Pat. Off. . |
| 606939 | 7/1994 | European Pat. Off. . |
| 606940 | 7/1994 | European Pat. Off. . |
| 627638 | 12/1994 | European Pat. Off. . |
| 1363539 | 6/1963 | France . |
| 2646183 | 4/1989 | France ............ D21H 21/48 |

| | | |
|---|---|---|
| 41 21 861 A1 | 1/1992 | Germany . |
| 4121861 | 1/1992 | Germany . |
| 63-017023 | of 0000 | Japan . |
| 50-123446 | 3/1974 | Japan . |
| 52-21261 | 9/1978 | Japan . |
| 57-207204 | 12/1982 | Japan . |
| 61-241712 | 10/1986 | Japan . |
| 61-245104 | 10/1986 | Japan . |
| 63-289070 | 5/1987 | Japan . |
| 62-295024 | 12/1987 | Japan . |
| 63-55503 | 3/1988 | Japan . |
| 63-75704 | 4/1988 | Japan . |
| 63-168604 | 7/1988 | Japan . |
| 63-168626 | 7/1988 | Japan . |
| 63-180905 | 7/1988 | Japan . |
| 63-181201 | 7/1988 | Japan . |
| 63-208001 | 8/1988 | Japan . |
| 64-11203 | 1/1989 | Japan . |
| 2-059702 | of 1990 | Japan . |
| 3-111819 | 5/1991 | Japan . |
| 4-141603 | 5/1992 | Japan . |
| 4-184429 | 7/1992 | Japan . |
| 4-356038 | 12/1992 | Japan . |
| 5-288910 | 11/1993 | Japan . |
| 6-11607 | 1/1994 | Japan . |
| 6-222207 | 8/1994 | Japan . |
| 7-6043 | 1/1995 | Japan . |
| 7-64085 | 3/1995 | Japan . |
| 7-198915 | 8/1995 | Japan . |
| 7-333440 | 12/1995 | Japan . |
| 162481 | 2/1970 | Netherlands . |
| 1015706 | 1/1966 | United Kingdom . |
| 1125709 | 8/1968 | United Kingdom . |
| 2 052 779 | 1/1981 | United Kingdom . |
| 2052779 | 1/1981 | United Kingdom . |
| 2124403 | 2/1984 | United Kingdom ............. G02B 5/14 |
| 2232498 | 5/1989 | United Kingdom ............. G02B 5/28 |
| WO 91/09719 | 7/1991 | WIPO . |
| WO 92/12857 | 8/1992 | WIPO . |
| WO 92/22838 | 12/1992 | WIPO . |
| WO 93/16878 | 9/1993 | WIPO . |
| WO 94/11776 | 5/1994 | WIPO . |
| WO 94/13478 | 6/1994 | WIPO . |
| WO 94/23933 | 10/1994 | WIPO . |
| WO 94/26512 | 11/1994 | WIPO . |
| WO 94/29765 | 12/1994 | WIPO . |
| WO 95/27919 | 4/1995 | WIPO . |
| WO 95/33223 | 5/1995 | WIPO . |
| WO 95/17303 | 6/1995 | WIPO . |
| WO 95/17691 | 6/1995 | WIPO . |
| WO 95/17692 | 6/1995 | WIPO . |
| WO 95/17699 | 6/1995 | WIPO . |
| WO 96/19347 | 12/1995 | WIPO . |
| WO 97/01440 | 1/1997 | WIPO . |
| WO 97/01774 | 1/1997 | WIPO . |
| WO 97/32226 | 9/1997 | WIPO . |

OTHER PUBLICATIONS

"Near–Infrared Absorbing Dyes", Juergen Fabian, Hiroyuki Nakazumi and Masaru Matsuoka, 1992, American Chemical Society, no (mo).

Pegis et al., *Progress in Optics,* vol. 1 (1961), (no mo.).

"A Psychological Color Solid*" Dorothy Nickerson and Sidney Newhall, Journal of the Optical Society of America, vol. 33, No. 7, Jul. 1943.

Heavens et al., "Staggered Broad–Band Reflecting Multi-layers", Optical Society of America, (Reprinted from *Applied Optics*, vol. 5(3), 373–376 (Mar. 1966)), pp. 321–324.

Czopek, J., "The Mechanics of Making Mirrors" *Glass Magazine,* p. 36–39 (Dec. 1995).

Mills, E., "Windows as Luminaries" *IAEEL Newsletter,* p. 11–13 (Mar./Apr. 1995).

"Bringing Ideas to Life" Zeneca Specialist Colours, (no date).

Kenedy, "Big Pane—No Gain" *USGOpenings,* US Glass, p. 54–57 (Jul. 1995).

Final Report, "Fenestration 2000—Phase II: Review of Advanced Glazing Technology and Study of Benefits for the UK", Halcrow Gilbert Assoc Ltd, p. 1–67, (Feb. 1992).

"Instructions for Field Change", Jan. 1989, G. Prince, Inst. Sheet 78–8063–2625–8.

Derwent Abstract, JP 63017023, (no date).

Abstract, Japan 62–295024, 1987, (no mo).

Abstract, Japan, 4–356038, 1992, (no mo).

Alfrey, Jr. et al., "Physical Optics of Iridescent Multilayered Plastic Films", *Polymer Engineering and Science,* vol. 9, No. 6, Nov. 1969.

Radford et al., "Reflextivity of Iridescent Coextruded Multilayered Plastic Films", presented at the Amercian Chemical Society Symposium on "Coextruded Plastic Films, Fibers, Composites", Apr. 9–14, 1972.

3M IR–Compatible Safelight Kit, Instruction Sheet 78–8063–2625–8, Jan. 1989, pp. 1–7.

3M IR Safelight Brochure, 1991, (no mo.).

Boese et al., Chain Orientation and Anisotropies in Optical and Dielectric Properties in Thin Films of Stiff Polyimides, *Journal of Polymer Science, Part B: Polymer Physics*, vol. 30, p. 1321–1327 (1992) (no mo).

Baba et al., "Optical anisotropy of stretched gold island films: experimental results", *Optics Letters,* vol. 17, No. 8, Apr. 15, 1992.

Weber, "Retroteflecting Sheet Polarizer", SID conf. Proceedings, Boston, MA, May 1992, *SID 92 Digest,* pp. 427–429.

Weber, "Retroflective Sheet Polarizer", SID conf. Proceedings, Seattle, WA, May 1993, *SID Digest,* pp. 669–672.

Hodgkinson et al., "Effective principal refractive indices and column angles for periodic stacks of thin birefringent films", *Optical Society of America,* vol. 10, No. 9, p. 2065–2071, Sep. 1993.

Zang et al., "Giant Anistropies in the Dielectric Properties of Quasi–Expitaxial Crystalline Organic Semiconductor Thin Films", (no date).

OPTICAL POLARIZER

CROSS-REFERENCE TO RELATED APPLICATIONS

This application is a division of U.S. patent application Ser. No. 09/013,819, filed Jan. 27, 1998, which is a continuation of U.S. patent application Ser. No. 08/402,042, filed Mar. 10, 1995, now abandoned, which is a continuation in part of U.S. patent application Ser. Nos. 08/171,239 now abandoned, and 08/171,098, now abandoned, which were filed Dec. 21, 1993, and is a continuation in part of U.S. patent application Ser. Nos. 08/359,436, now abandoned, and 08/360,215, now abandoned, which were filed Dec. 20, 1994, all of which are incorporated herein by reference.

TECHNICAL FIELD

The invention is an improved optical polarizer.

BACKGROUND

Optical polarizing film is widely used for glare reducing sunglasses, increasing optical contrast, and in Liquid Crystal Displays (LCD). The most commonly used type of polarizer used in these applications is a dichroic polarizer. Dichroic polarizers are made by incorporating a dye into a polymer sheet that is stretched in one direction. Dichroic polarizers can also be made by uniaxially stretching a semicrystalline polymer such as polyvinyl alcohol, then staining the polymer with an iodine complex or dichroic dye, or by coating a polymer with an oriented dichroic dye. These polarizers typically have an extinction ratio (the ratio of transmission of light polarized perpendicular to the stretch direction to the polarization parallel to the stretch direction) of over 500:1. Dichroic polarizers normally have some absorption of light polarized in the high transmission orientation. Losses in this orientation are typically 10–20%.

Commercial polarizers typically use polyvinyl alcohol as the polymer matrix for the dye, however other polymers can be used. U.S. Pat. No. 4,756,953 describes the use of polyethylene naphthalate as the polymer matrix.

Low profile, sheet form reflective polarizers are available that reflect one polarization of light and transmit the other. These polarizers tend to be more efficient in transmitting light of the high transmission polarization. This is due to the use of a non-absorbing dielectric stack for polarizing light. These polarizers tend to have equal reflectivity for light irradiating the sheet from either side. These types of polarizers also tend to have some defects, such as leakage of light through localized areas of the sheet, and incomplete reflectivity of the high extinction polarization over the wavelength region of interest. This leakage of light and incomplete reflectivity is often called iridescence.

SUMMARY

A reflective polarizer and a dichroic polarizer are combined to provide an improved optical polarizer. The dichroic and reflective polarizers are typically in close proximity to each other, and are preferably bonded together to eliminate the air gap between the polarizers. The combination of the two polarizers provides a high reflectivity for light of a first polarization and high transmission for light of a second, perpendicular polarization from the reflective polarizer side of the optical polarizer, and high absorption for light of the first polarization and high transmission for light of the second, perpendicular polarization from the dichroic polarizer side. Iridescence as seen in transmission and when viewed in reflection from the dichroic polarizer side is also reduced as compared to the reflective polarizer alone. This reduction in iridescence is useful in improving the cosmetic appearance of optical displays, the extinction ratio of optical polarizers, and the optical uniformity of a display.

The increased extinction ratio and low reflectivity of the present optical polarizer allows use of a lower extinction ratio dichroic polarizer in applications requiring a given extinction ratio. By lowering the extinction ratio required of dichroic polarizer the absorptive losses in the dichroic polarizer for transmitted rays can be reduced. Thus, the present optical polarizer has improved transmissive extinction ratios for rays entering from either side of the present optical polarizer, low reflected intensity for rays partially transmitted by the dichroic polarizer in the first polarization that are reflected by the reflective polarizer, and lower absorptive losses as compared to a dichroic polarizer alone.

BRIEF DESCRIPTION OF THE DRAWINGS

The various objects, features and advantages of the present optical polarizer shall be better understood upon reading and understanding the following detailed description and accompanying drawings in which.

DETAILED DESCRIPTION

Figure 1:
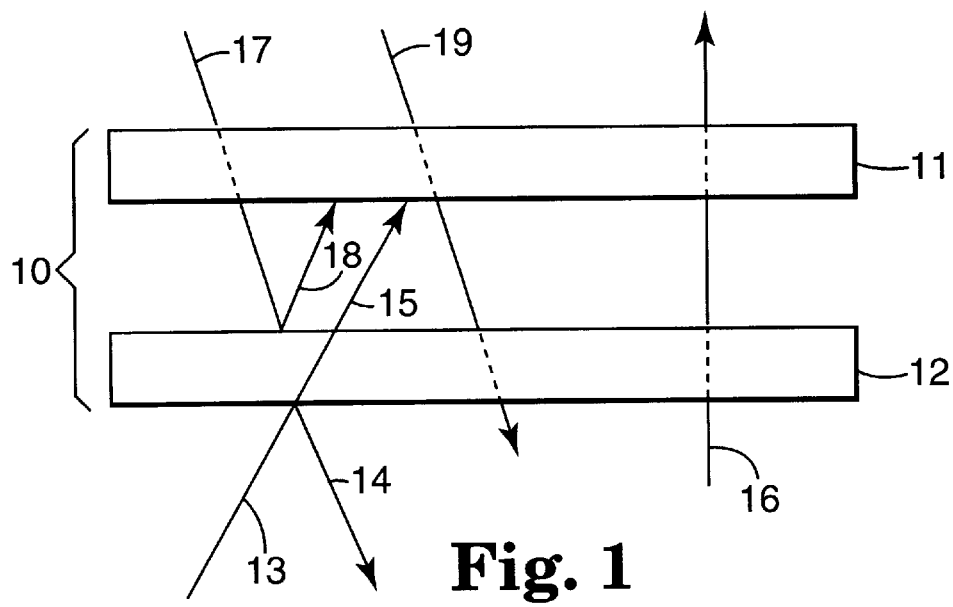
FIG. 1 shows the present optical polarizer, including a reflective polarizer and a dichroic polarizer placed proximate thereto.

FIG. 1 shows an optical polarizer 10 that has two primary components. These are a dichroic polarizer 11 and a reflective polarizer 12. The two polarizers are aligned to provide maximum transmissivity. The combination of the two polarizers provides a high reflectivity for light of a first polarization and high transmission for light of a second, perpendicular polarization from the reflective polarizer side of the optical polarizer, and high absorption for light of the first polarization and high transmission for light of the second, perpendicular polarization from the dichroic polarizer side.

In use, the combined polarizers are illuminated on one or both of the outside facing surfaces. Ray 13 is of a polarization that is preferentially reflected by reflective polarizer 12 to form ray 14. Light of ray 13 transmitted by reflective polarizer 12 forms ray 15 which is attenuated by dichroic polarizer 11. Light ray 16 which is perpendicularly polarized to ray 13 is preferentially transmitted by reflective polarizer 12 and is slightly attenuated by dichroic polarizer 11. Ray 17 is of a polarization that is preferentially absorbed by dichroic polarizer 11, and which is also preferably of the same polarization as ray 13. The portion of light of ray 17 which is transmitted by dichroic polarizer 11 is further attenuated by reflection off reflective polarizer 12 forming ray 18 which is further absorbed by dichroic polarizer 11. Light ray 19 which is polarized perpendicular to ray 17, and which is of the same polarization as ray 16, is preferentially transmitted by both dichroic and reflective polarizers 11 and 12, respectively.

The dichroic polarizer 11 is typically in close proximity to the reflective polarizer 12. Preferably they are bonded to each other to eliminate the air gap between the polarizers, as shown in FIG. 2.

Figure 2:
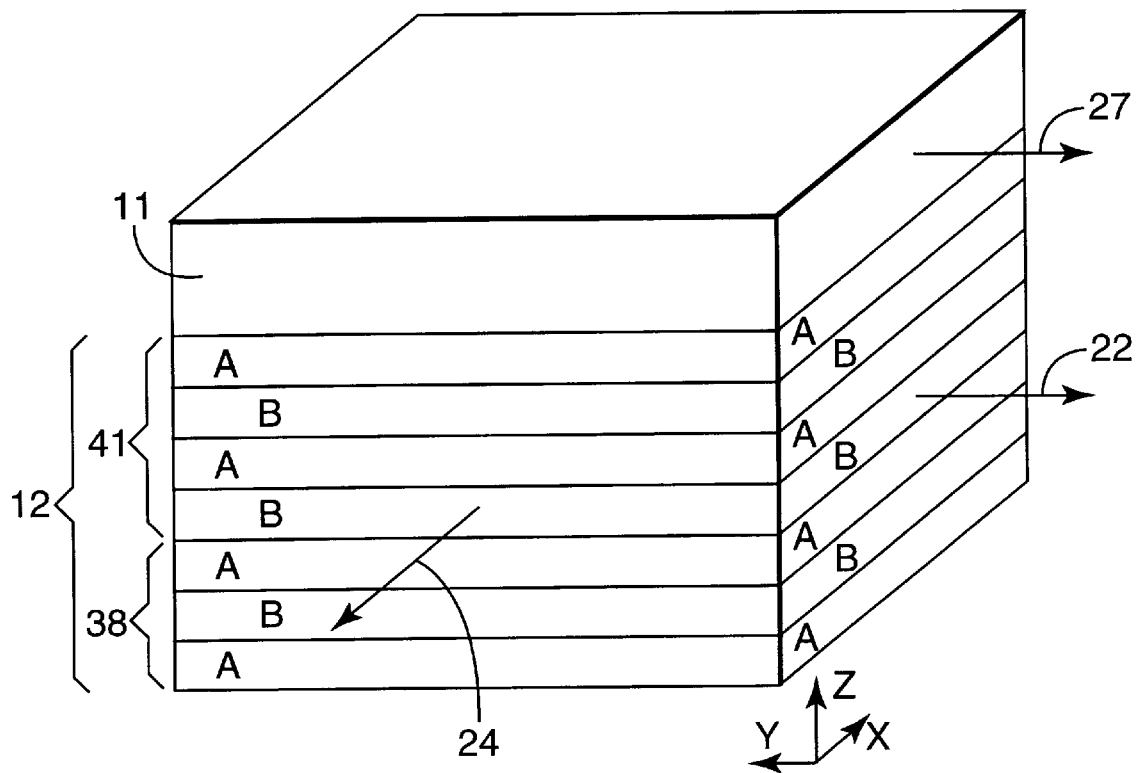
FIG. 2 shows a preferred multilayer reflective polarizer having a dichroic polarizer bonded thereto.

The preferred and illustrative reflective polarizer body 12 shown in FIG. 2 is made of alternating layers (ABABA . . . ) of two different polymeric materials. These are referred to as material "(A)" and material "(B)" throughout the drawings and description. The two materials are extruded together and the resulting multiple layer (ABABA . . . ) material is stretched (5:1) along one axis (X) and is not stretched appreciably (1:1) along the other axis (Y). The X axis is referred to as the "stretched" direction while the Y axis is referred to as the "transverse" direction.

The (B) material has a nominal index of refraction (1.64 for example) which is not substantially altered by the stretching process. The (A) material has the property of having the index of refraction altered by the stretching process. For example, a uniaxially stretched sheet of the (A) material will have one index of refraction (1.88 for example) associated with the stretched direction and a different index of refraction (1.64 for example) associated with the transverse direction. By way of definition, the index of refraction associated with an in-plane axis (an axis parallel to the surface of the film) is the effective index of refraction for plane-polarized incident light whose plane of polarization is parallel to that axis.

Thus, after stretching, the multiple layer stack (ABABA . . . ) of material shows a large refractive index difference between layers (1.88 minus 1.64) associated with the stretched direction. While in the transverse direction, the associated indices of refraction between layers are essentially the same (1.64 and 1.64 in the example). These optical characteristics cause the multiple layer laminate to act as a reflecting polarizer that will transmit the polarization component of the incident light which is correctly oriented with respect to the axis 22. Axis 22 is defined as the transmission axis. The light which is transmitted by the reflective polarizer body 12 is referred to as having a first polarization orientation.

The light which does not pass through the reflective polarizer body 12 has a polarization orientation orthogonal or perpendicular to the first orientation. Light exhibiting this polarization orientation will encounter the index difference which results in reflection of this light. This defines a so-called "extinction" axis 24. In this fashion the reflective polarizer body 12 transmits light having a selected polarization, and reflects light having the other polarization.

The optical performance and uniformity of a reflective polarizer can be improved by adding a dichroic polarizer proximate to at least one side of the multilayer stack, or by incorporating a dichroic polarizer into at least one of the layers in the multilayer stack. In such a configuration, the transmission axis 27 of the dichroic polarizer 11 is preferably aligned with the transmission axis 22 of the reflective polarizer 12. When the dichroic polarizer 11 is on one side of reflective polarizer 12, as shown in FIG. 1, the reflection of light ray 17 on the dichroic polarizer side will be reduced due to attenuation of reflected ray 18 by dichroic polarizer 11 in comparison to the reflection of ray 17 off reflective polarizer 12 without dichroic polarizer 11. The reflectivity of ray 13 off reflective polarizer 12 is not substantially affected by dichroic polarizer 11. This produces an optical polarizer 10 which is antireflective on at least one side. Antireflection of one side of the optical polarizer 10 is useful in displays, particularly in certain backlit displays where the reflected polarization can be used to increase the display brightness while the other side, the viewing side, of the polarizer must not reflect light. Iridescence as seen in transmission through either direction, and iridescence when viewed in reflection from the dichroic polarizer side are reduced by the addition of dichroic polarizer 11. This reduction in iridescence is useful in improving the cosmetic appearance of the display, the extinction ratio of the polarizer, and the optical uniformity of the display.

The configuration of dichroic and reflective polarizers shown in FIG. 1 creates a high efficiency optical polarizer. Combining dichroic polarizer 11 with reflective polarizer 12 results in an optical polarizer 10 which has a higher extinction ratio for transmitted light than that which is achieved using the dichroic polarizer alone. This configuration also produces low reflectivity for ray 17 from the dichroic polarizer side due to attenuation of reflected ray 18 by dichroic polarizer 11. For applications requiring a given extinction ratio and high transmissivity, the increased extinction ratio and low reflectivity of optical polarizer 10 allows the use of a dichroic polarizer 11 which has a lower extinction of the first polarization than could otherwise be used. By lowering the extinction required of dichroic polarizer 11, the absorptive losses in polarizer 11 for transmitted rays 16 and 19 can be reduced. Thus, the optical polarizer 10 has improved transmissive extinction ratios for ray pair 17 and 19 and ray pair 13 and 16, low reflected intensity for reflected ray 18 off of reflective polarizer 12, and lower absorptive losses than could be achieved using a dichroic polarizer alone. The preferred extinction for the dichroic polarizer 11 for use in liquid crystal displays is 10 to 99.99%, more preferred is 50 to 99%, more preferred is 60 to 97%, and most preferred is 70 to 95%. The preferred extinction for the reflective polarizer is 20 to 99.99%, more preferred is 50 to 99.9% and most preferred is 90 to 99%.

Reflective polarizers may have some dielectric interference in the second polarization at either normal or off-normal angles, or both. This reflection may present problems due to reflected glare and attenuation of transmitted light of the second polarization. An efficient dichroic polarizer aligned as shown in FIG. 1 will only weakly attenuate this reflection. In certain applications, this reflection will be acceptable. In general, however, the reflective polarizer will preferably have minimal reflection in the second polarization over the range of optical angles used by the device (nominally +/−45 degrees for a TFT or STN liquid crystal display). In general it is preferred that the reflection of the reflective polarizer of linearly polarized light of the second polarization be less than 20%, more preferably less than 10%, and most preferably less than 5%. This reflectivity is the average for the wavelength range and use angle range of interest for specific or general applications. It is also preferred that the reflectivity of the reflective polarizer for linearly polarized light of the first polarization be preserved over angles orthogonal to the extinction axis relative to the normal direction. Preferred is that the reflectivity of the first polarization is reduced to no less than 30% at the maximum angle of interest, more preferred is 60%, and most preferred is that the reflectivity be maintained or increase at off-normal angles over the range of angles of interest.

The reflective and dichroic polarizers may be various combinations of broad band and narrow band polarizers. For example, a narrow band reflective polarizer may be combined with a dichroic polarizer with extinction over the same band range. This combination can be used to produce polarizers in the red, green, blue, cyan, magenta, or yellow bands with higher extinction and superior color definition compared to a colored dichroic polarizer. Other combinations include the use of a broad band reflective polarizer with dichroic polarizers with nonuniform extinction in the visible spectrum. For example, certain polyvinyl alcohol/iodine polarizers have excellent extinction in the green and red portion of the spectrum, and less in the blue. This polarizer can be combined with a broad band reflective polarizer in order to provide good extinction at blue wavelengths. Non-uniform optical extinction may also be useful for increasing the optical performance of the combined polarizers. For example, the maximum radiometric transmission from the combination of reflective and dichroic polarizers may be obtained with minimum luminous reflectivity by using a dichroic polarizer with relatively high absorption in the green and less absorption in the blue and red. Insufficient extinction in the reflective polarizer at normal and off-normal angles may also be compensated by increasing the extinction of the dichroic polarizer in the necessary spectral regions. For example, a reflective polarizer that has insufficient extinction for red light of the second polarization at off-normal angles can be compensated by using a dichroic polarizer with relatively red high extinction.

Dichroic polarizer 11 can be incorporated into optical polarizer 10 by placing the reflective and dichroic polarizers in the same optical path or by laminating them together. Dichroic polarizer 11 can be incorporated with reflective polarizer 12 before orientation by extruding or laminating at least one layer of a mixture of dichroic dyestuff in polymer onto the multilayer cast film, by a dichroic dyestuff added to the polymer resin of one or more of the skin layers of the multilayer reflective polarizer, or by adding dye to one or more layers in the multilayer stack. Multilayer extrusion techniques also allow the ability to tailor the distribution of dichroic dye within the individual layers making up the optical stack. This may allow the dye to be located in regions of greatest utility. For example, a dye may be preferably concentrated in regions of maximum or minimum "E" field intensity within the optical stack. By appropriate choice of the dichroic dyestuff and polymer matrix, stretching the resulting film will simultaneously produce the dichroic and reflective polarizers in the proper orientation.

Anthraquinone and azo dyes may be used as the dichroic dye, as well as other dichroic dye materials. In some applications the dye does not have to be highly dichroic when oriented. Applications requiring relatively high absorption of both polarizations, for example, sunglasses or in displays requiring reduced glare, can use a less dichroic, or non-dichroic dye.

The dichroic polarizer 11 may be incorporated into one or both sides of a reflective polarizer by coating a solution of polyvinyl alcohol onto the cast (unoriented) multilayer film and simultaneously forming the multilayer reflective polarizer and the dichroic polarizer. The cast film can be primed for adhesion before coating by solution coating on an inorganic or polymeric primer layer, corona treatment, or by physical treatment. A suitable solution based primer for this application are water soluble copolyesters commonly used for priming polyethylene terephthlate films such as described in U.S. Pat. No. 4,659,523. The polyvinyl alcohol coating solution should contain between 2 and 20% polymer in water based on weight, with the preferred concentration being between 5 and 15%. The polyvinyl alcohol should have a degree of hydrolysis of between 95 and 100%, preferably between 97 and 99.5%. The dry coating weight should range from 2 to 80 grams per square meter. The polyvinyl alcohol coated cast film is then stretched at elevated temperatures to develop oriented polyvinyl alcohol and the multilayer reflective polarizer. This temperature is preferably above the glass transition temperature of least one of the components of the multilayer reflective polarizer. In general, the temperature should be between 80 and 160 C., preferably between 100 and 160 C. The film should be stretched from 2 to 10 times the original dimension. Preferably, the film will be stretched from 3 to 6 times the original dimension. The film may be allowed to dimensionally relax in the cross-stretch direction from the natural reduction in cross-stretch direction (equal to the square root of the stretch ratio) to being constrained (i.e. no substantial change in cross-stretch dimensions). The film may be stretched in the machine direction, as with a length orienter, or in width using a tenter. The oriented polyvinyl alcohol coating is then stained with either iodine based staining solutions, dye based staining solutions, or combinations of the two solutions and stabilized if necessary with suitable solutions such as boric acid and borax in water. Such staining and fixing techniques are known in the art. After drying the film, the dichroic polarizer can be protected by laminating or coating on a protective film such as cellulose based polymers, acrylate polymers, polycarbonate polymers, solution based or radiation cured acrylate based adhesive or non-adhesive coatings, polyethylene terephthalate or other polyester based films, or an additional sheet of reflective polarizer film. In cases where the state of polarized light rays entering or exiting the polarizer 10 from the dichroic polarizer side is not critical, birefringent polymers such as biaxially oriented polyethylene terephthalate may be used as the protective layer.

A dichroic polarizer suitable for use in this invention is described in U.S. Pat. Nos. 4,895,769 and 4,659,523. The polarizers described in these patents may be combined with the reflective polarizer preferably with one side of the polyvinyl alcohol dichroic polarizer protected with a separate polymer and the other side of the dichroic polarizer bonded to the reflective polarizer. The dichroic polarizer may be made from relatively thin polyvinyl alcohol coatings (i.e., preferably less than 40 g per square meter, more preferably less than 10 g/m$^2$, more preferably less than 4 g/m$^2$, even more preferably less than 2 g/m$^2$). Thin coatings will have less absorption of the polarization perpendicular to the stretch direction, yet still have good extinction in first polarization when the high transmission axis is aligned with the high transmission axis of a reflective polarizer. Thin coatings are also faster to process.

The polarizer of this invention has at least one dichroic polarizer and one reflective polarizer sections (as shown in FIG. 1). Other combinations are also suitable, including polarizers having either dichroic/reflective/dichroic sections or reflective/dichroic/reflective sections.

Figure 3:
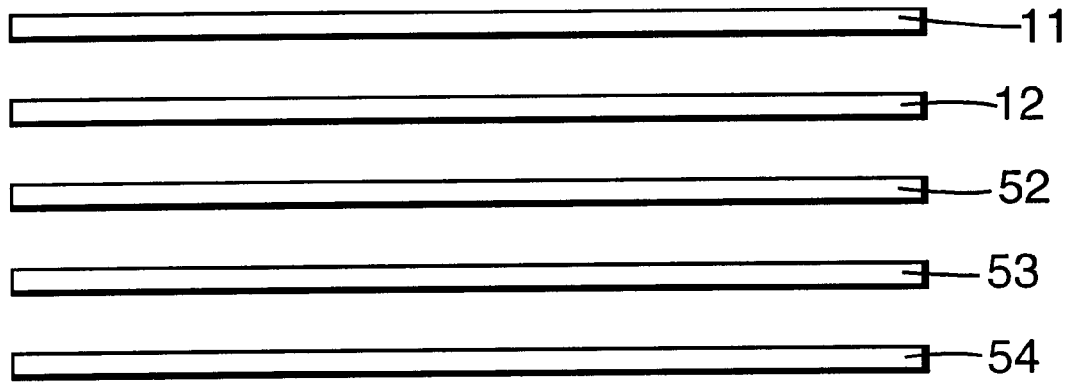
FIG. 3 shows an embodiment of a display incorporating a reflective polarizer and dichroic polarizer.

FIG. 3 shows the combined reflective polarizer 12 and dichroic polarizer 11 as used in a transmissive display. Liquid crystal module 52 switches the polarization of transmitted light supplied by backlight 54 through a conventional dichroic polarizer 53. In this mode, the reflective polarizer returns at least a portion of the light of the first polarization passed by the liquid crystal module 52 back into the backlight. This light may be recycled by the backlight and be used to increase the brightness of the display.

Figure 4:
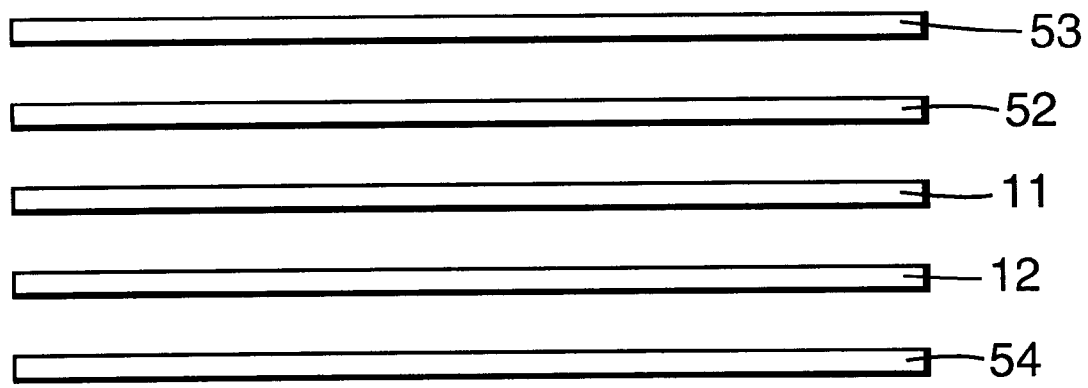
FIG. 4 shows another embodiment of a display incorporating a reflective polarizer and dichroic polarizer.

FIG. 4 shows the use of the combined polarizers 11 and 12 as the rear polarizer in a transmissive display. In this mode, the reflective polarizer may enhance the brightness of a display by returning the light of the first polarization that would ordinarily be absorbed by the rear dichroic polarizer in a conventional display.

Figure 5:
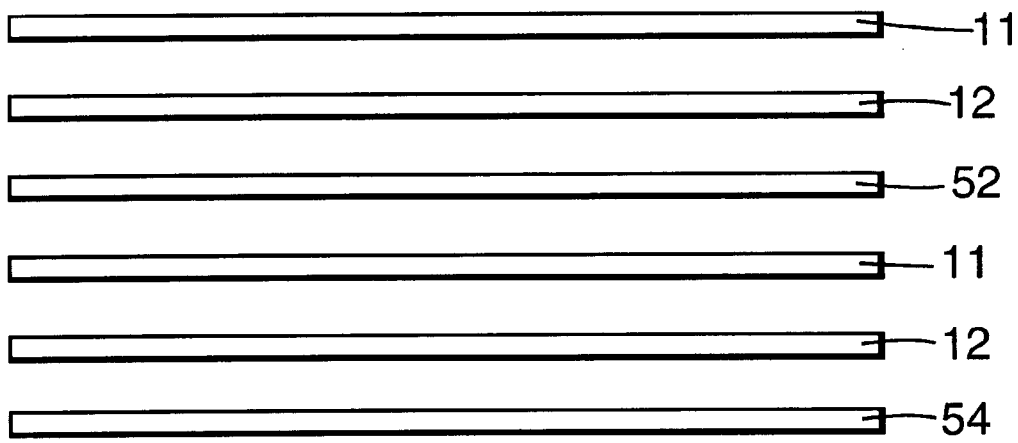
FIG. 5 shows another embodiment of a display incorporating two combined reflective polarizers and dichroic polarizers.

FIG. 5 shows combined polarizers 11 and 12 used as both the front and rear polarizers in a display. The displays shown in FIGS. 3, 4, and 5 can be used in a transflective mode by inserting a partial reflector between the backlight and the rear polarizer, and can be used as a reflective display by replacing the backlight with a reflective film.

In the display configurations of FIGS. 4 and 5, it may be desirable to laminate or otherwise similarly attach the optical polarizer to the optical cavity. Laminating the optical polarizer to the optical cavity eliminates the air gap between them and thus reduces surface reflections which would otherwise occur at the air/reflective polarizer element boundary. These reflections reduce the total transmission of the desired polarization by the reflective polarizing element. By attaching the reflective polarizer side of the optical polarizer to the optical cavity, these surface reflections are reduced and total transmission of the desired polarization by the optical polarizer is increased. If the optical polarizer is not so attached to the optical cavity, use of an AR coated polarizer such as that described below in Example 13 may be desirable, particularly in the display configurations of FIGS. 4 and 5.

Figure 6:
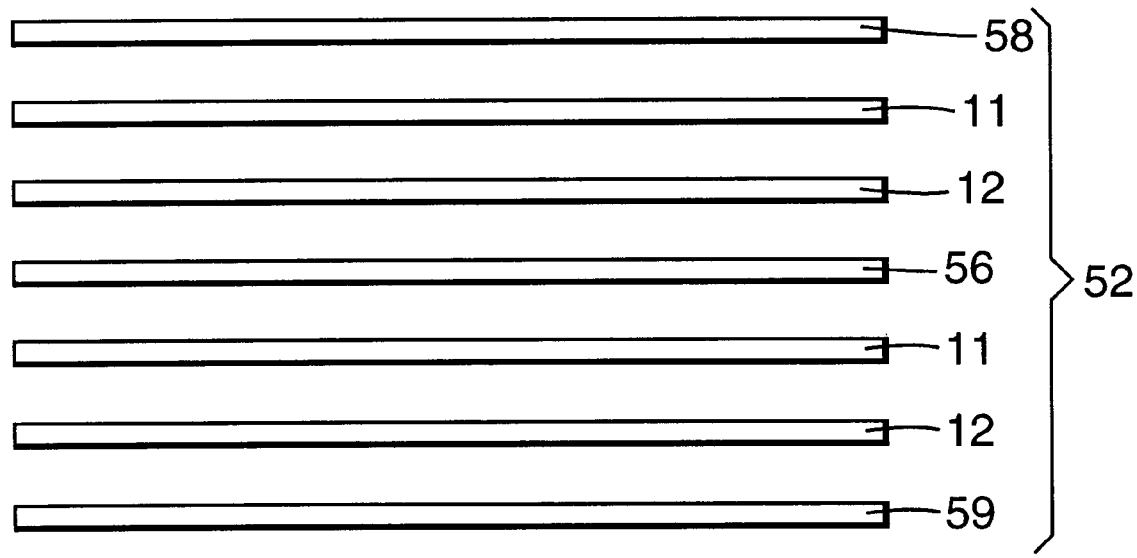
FIG. 6 shows a liquid crystal display incorporating a reflective polarizer and a dichroic polarizer.

Most liquid crystal modules 52 such as those shown in FIGS. 3, 4, and 5 generally include a thin layer of liquid crystal material sandwiched between two glass layers. To minimize parallax, the configuration shown in FIG. 6 can be used. There the combined polarizers 11 and 12 are located between the liquid crystal 56 and glass layers 58 and 59 of the liquid crystal module 52. By locating the combined polarizers in this manner, parallax which may be otherwise introduced in varying degrees depending upon the thickness of the glass layers is eliminated.

A Polaroid Corporation model number HN-38 dichroic polarizing film was placed against the multilayer reflective polarizer formed as discussed herein. The polarizers were aligned for maximum transmission of one polarization. The combination of the dichroic and reflective polarizers eliminated visible iridescence of the reflective polarizing film when viewed in transmission in either direction. The dichroic polarizer also eliminated reflected visible iridescence from the reflective polarizer when viewed in reflection through the dichroic polarizer. Thus, the combination of a dichroic polarizer with a reflective polarizer improves the cosmetic uniformity of the reflective polarizer.

The reflectivity and transmissivity of this optical polarizer was measured with a Lambda 9 spectrophotometer at 550 nm using a sample beam polarized with a Melles-Griot dichroic polarizer model number 03-FPG-009. Reflectivity measurements were made using an integrating sphere. Separate reflectivity measurements were made with the samples backed first with a white diffuse reflector and then with a black backing. The transmissivity of the combined polarizers was 65.64% when aligned in the spectrophotometer for maximum transmission, and 0.05% when aligned for minimum transmission. When the dichroic polarizer was facing the integrating sphere and an absorbing backing was used, the reflectivity of the combined polarizers was 13.26% when aligned for maximum reflectivity and 4.37% when aligned for minimum reflectivity. The maximum and minimum reflectivity of the combined polarizers when the reflective polarizer was facing the integrating sphere was 99.22% and 16.58%, respectively. The above measurements were repeated with a white reflection standard behind the sample. The reflectivity of the combined polarizers with the dichroic polarizer facing the integrating sphere was 47.47% when aligned for maximum reflectivity, and 4.41% when aligned for minimum reflectivity. The maximum and minimum reflectivity of the combined polarizers when the reflective polarizer was facing the integrating sphere was 99.32% and 36.73%, respectively. Thus, the combination of the two polarizers effectively renders one side of the reflective polarizer antireflected without substantially affecting the reflectivity of the other side of the reflective polarizer The transmission of Polaroid Corporation model HN-38 dichroic polarizing film and the reflective polarizer were measured at 430 nm using the procedure described above. The transmission of the dichroic polarizer with the sample cross polarized to the sample beam was 0.63%. The transmission of the reflective polarizer under the same conditions was 48%. The transmission of the combination of the two polarizers aligned for minimum transmission was 0.31%. Thus, the extinction of a dichroic polarizer can be increased by including a reflective polarizer in the optical path.

Optical Behavior and Design Considerations of Multilayer Stacks

The optical behavior of a multilayer stack 10 such as that shown above in FIG. 2 will now be described in more general terms.

The optical properties and design considerations of multilayer stacks described below allow the construction of multilayer stacks for which the Brewster angle (the angle at which reflectance goes to zero) is very large or is nonexistant. This allows for the construction of multilayer mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

The average transmission at normal incidence for a multilayer stack, (for light polarized in the plane of the extinction axis in the case of polarizers, or for both polarizations in the case of mirrors), is desirably less than 50% (reflectivity of 0.5) over the intended bandwidth. (It shall be understood that for the purposes of the present application, all transmission or reflection values given include front and back surface reflections). Other multilayer stacks exhibit lower average transmission and/or a larger intended bandwidth, and/or over a larger range of angles from the normal. If the intended bandwidth is to be centered around one color only, such as red, green or blue, each of which has an effective bandwidth of about 100 nm each, a multilayer stack with an average transmission of less than 50% is desirable. A multilayer stack having an average transmission of less than 10% over a bandwidth of 100 nm is also preferred. Other exemplary preferred mutlilayer stacks have an average transmission of less than 30% over a bandwidth of 200 nm. Yet another preferred multilayer stack exhibits an average transmission of less than 10% over the bandwidth of the visible spectrum (400–700 nm). Most preferred is a multilayer stack that exhibits an average transmission of less than 10% over a bandwidth of 380 to 740 nm. The extended bandwidth is useful even in visible light applications in order to accommodate spectral shifts with angle, and variations in the multilayer stack and overall film caliper.

The multilayer stack 10 can include tens, hundreds or thousands of layers, and each layer can be made from any of a number of different materials. The characteristics which determine the choice of materials for a particular stack depend upon the desired optical performance of the stack.

The stack can contain as many materials as there are layers in the stack. For ease of manufacture, preferred optical thin film stacks contain only a few different materials. For purposes of illustration, the present discussion will describe multilayer stacks including two materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Several parameters may affect the maximum reflectivity achievable in any multilayer stack. These include basic stack design, optical absorption, layer thickness control and the relationship between indices of refraction of the layers in the stack. For high reflectivity and/or sharp bandedges, the basic stack design should incorporate optical interference effects using standard thin film optics design. This typically involves using optically thin layers, meaning layers having an optical thickness in the range of 0.1 to 1.0 times the wavelength of interest. The basic building blocks for high reflectivity multilayer films are low/high index pairs of film layers, wherein each low/high index pair of layers has a combined optical thickness of ½ the center wavelength of the band it is designed to reflect. Stacks of such films are commonly referred to as quarterwave stacks.

To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to tune the multilayer stack such that the "blue" layers are on the incident side of the multilayer stack.

A multilayer construction of alternative low and high index thick films, often referred to as a "pile of plates", has no tuned wavelengths nor bandwidth constraints, and no wavelength is selectively reflected at any particular layer in the stack. With such a construction, the blue reflectivity suffers due to higher penetration into the stack, resulting in higher absorption than for the preferred quarterwave stack design. Arbitrarily increasing the number of layers in a "pile of plates" will not always give high reflectivity, even with zero absorption. Also, arbitrarily increasing the number of layers in any stack may not give the desired reflectivity, due to the increased absorption which would occur.

The relationships between the indices of refraction in each film layer to each other and to those of the other layers in the film stack determine the reflectance behavior of the multilayer stack at any angle of incidence, from any azimuthal direction. Assuming that all layers of the same material have the same indices, then a single interface of a two component quarterwave stack can be analyzed to understand the behavior of the entire stack as a function of angle.

For simplicity of(discussion, therefore, the optical behavior of a single interface will be described. It shall be understood, however, that an actual multilayer stack according to the principles described herein could be made of tens, hundreds or thousands of layers. To describe the optical behavior of a single interface, such as the one shown in FIG. 7, the reflectivity as a function of angle of incidence for s and p polarized light for a plane of incidence including the z-axis and one in-plane optic axis will be plotted.

Figure 7:
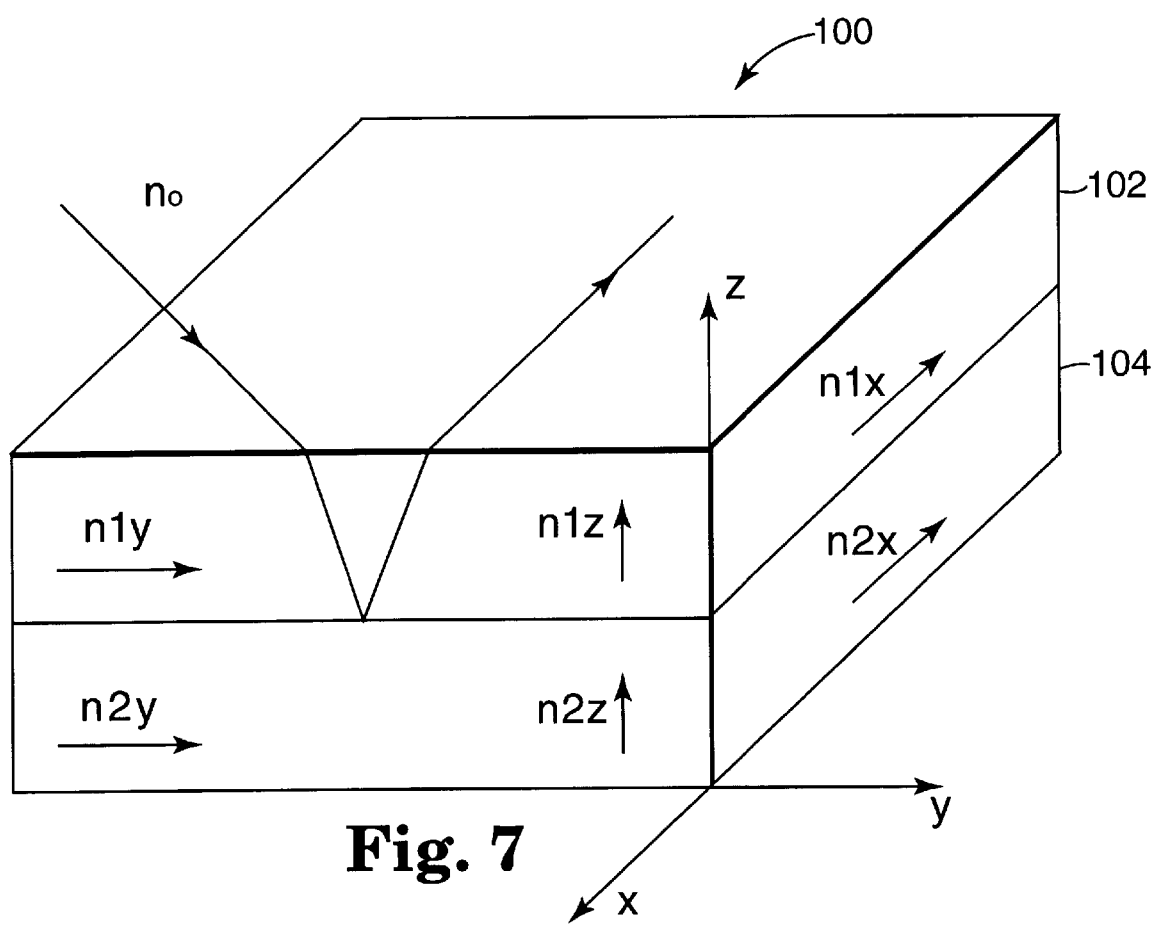
FIG. 7 shows a two layer stack of films forming a single interface.

FIG. 7 shows two material film layers forming a single interface, with both immersed in an isotropic medium of index no. For simplicity of illustration, the present discussion will be directed toward an orthogonal multilayer birefringent system with the optical axes of the two materials aligned, and with one optic axis (z) perpendicular to the film plane, and the other optic axes along the x and y axis. It shall be understood, however, that the optic axes need not be orthogonal, and that nonorthogonal systems are well within the spirit and scope of the present invention. It shall be further understood that the optic axes also need not be aligned with the film axes to fall within the intended scope of the present invention.

The reflectivity of a dielectric interface varies as a function of angle of incidence, and for isotropic materials, is different for p and s polarized light. The reflectivity minimum for p polarized light is due to the so called Brewster effect, and the angle at which the reflectance goes to zero is referred to as Brewster's angle.

The reflectance behavior of any film stack, at any angle of incidence, is determined by the dielectric tensors of all films involved. A general theoretical treatment of this topic is given in the text by R. M. A. Azzam and N. M. Bashara, "Ellipsometry and Polarized Light", published by North-Holland, 1987.

The reflectivity for a single interface of a system is calculated by squaring the absolute value of the reflection coefficients for p and s polarized light, given by equations 1 and 2, respectively. Equations 1 and 2 are valid for uniaxial orthogonal systems, with the axes of the two components aligned.

$$r_{pp} = \frac{n2z * n2o Ö(n1z^2 - no^2\sin^2 q) - n1z * n1o Ö(n2z^2 - no^2\sin^2 q)}{n2z * n2o Ö(n1z^2 - no^2\sin^2 q) + n1z * n1o Ö(n2z^2 - no^2\sin^2 q)} \quad 1)$$

$$r_{RS} = \frac{Ö(n1o^2 - no^2\sin^2 q) - Ö(n2o^2 - no^2\sin^2 q)}{Ö(n1o^2 - no^2\sin^2 q) + Ö(n2o^2 - no^2\sin^2 q)} \quad 2)$$

where q is measured in the isotropic medium.

In a uniaxial birefringent system, n1x=n1y=n1o, and n2x=n2y=n2o.

For a biaxial birefringent system, equations 1 and 2 are valid only for light with its plane of polarization parallel to the x-z or y-z planes, as defined in FIG. 7. So, for a biaxial system, for light incident in the x-z plane, n1o=n1x and n2o=n2x in equation 1 (for p-polarized light), and n1o=n1y and n2o=n2y in equation 2 (for s-polarized light). For light incident in the y-z plane, n1o=n1y and n2o=n2y in equation 1 (for p-polarized light), and n1o=n1x and n2o=n2x in equation 2 (for s-polarized light).

Equations 1 and 2 show that reflectivity depends upon the indices of refraction in the x, y (in-plane) and z directions of each material in the stack. In an isotropic material, all three indices are equal, thus nx=ny=nz. The relationship between nx, ny and nz determine the optical characteristics of the material. Different relationships between the three indices lead to three general categories of materials: isotropic, uniaxially birefringent, and biaxially birefringent. Equations 1 and 2 describe biaxially birefringent cases only along the x or y axis, and then only if considered separately for the x and y directions.

A uniaxially birefringent material is defined as one in which the index of refraction in one direction is different from the indices in the other two directions. For purposes of the present discussion, the convention for describing uniaxially birefringent systems is for the condition nx=ny$^1$nz. The x and y axes are defined as the in-plane axes and the respective indices, nx and ny, will be referred to as the in-plane indices.

One method of creating a uniaxial birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization.

A uniaxial birefringent material can have either positive or negative uniaxial birefringence. Positive uniaxial birefringence occurs when the z-index is greater than the in-plane indices (nz>nx and ny). Negative uniaxial birefringence occurs when the z-index is less than the in-plane indices (nz<nx and ny).

A biaxial birefringent material is defined as one in which the indices of refraction in all three axes are different, e.g., nx$^1$ny$^1$nz. Again, the nx and ny indices will be referred to as the in-plane indices. A biaxial birefringent system can be made by stretching the multilayer stack in one direction. In other words the stack is uniaxially stretched. For purposes of the present discussion, the x direction will be referred to as the stretch direction for biaxial birefringent stacks.

Uniaxial Birefringent Systems (Mirrors)

The optical properties and design considerations of uniaxial birefringent systems will now be discussed. As discussed above, the general conditions for a uniaxial birefringent material are nx=ny$^1$nz. Thus if each layer 102 and 104 in FIG. 7 is uniaxially birefringent, n1x=n1y and n2x=n2y. For purposes of the present discussion, assume that layer 102 has larger in-plane indices than layer 104, and that thus n1>n2 in both the x and y directions. The optical behavior of a uniaxial birefringent multilayer system can be adjusted by varying the values of n1z and n2z to introduce different levels of positive or negative birefringence. The relationship between the various indices of refraction can be measured directly, or, the general relationship may be indirectly observed by analysis of the spectra of the resulting film as described herein.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10% to 50%, and can cover a bandwidth of anywhere between, for example, 100 nm and 450 nm, depending upon the particular application. For a high efficiency mirror, average transmission along each stretch direction at normal incidence over the visible spectrum (400–700 nm) is desirably less than 10%, preferably less than 5%, more preferably less than 2%, and even more preferably less than 1%. In addition, asymmetric mirrors may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Equation 1 described above can be used to determine the reflectivity of a single interface in a uniaxial birefringent system composed of two layers such as that shown in FIG. 7. Equation 2, for s polarized light, is identical to that of the case of isotropic films (nx=ny=nz), so only equation 1 need be examined. For purposes of illustration, some specific, although generic, values for the film indices will be assigned. Let n1x=n1y=1.75, n1z=variable, n2x=n2y=1.50, and n2z=variable. In order to illustrate various possible Brewster angles in this system, no=1.60 for the surrounding isotropic media.

Figure 8:
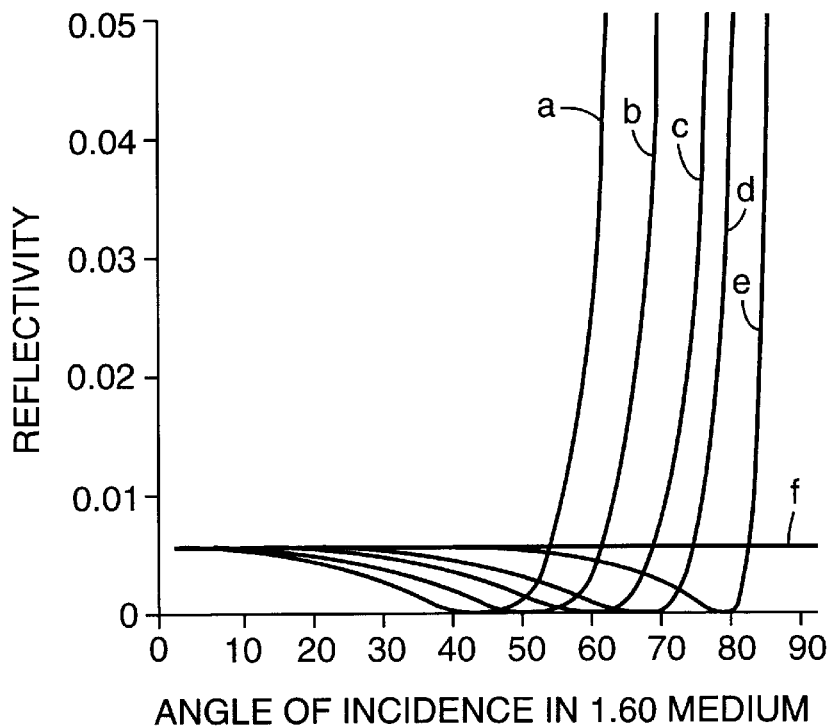
FIGS. 8 and 9 show reflectivity versus angle curves for a uniaxial birefringent system in a medium of index 1.60.

FIG. 8 shows reflectivity versus angle curves for p-polarized light incident from the isotropic medium to the birefringent layers, for cases where n1z is numerically greater than or equal to n2z(n1z$^3$n2z). The curves shown in FIG. 8 are for the following z-index values: a) n1z=1.75, n2z=1.50; b) n1z=1.75, n2z=1.57; c) n1z=1.70, n2z=1.60; d) n1z=1.65, n2z=1.60; e) n1z=1.61, n2z=1.60; and f) n1z=1.60=n2z. As n1z approaches n2z, the Brewster angle, the angle at which reflectivity goes to zero, increases. Curves a–e are strongly angular dependent. However, when n1z=n2z (curve f), there is no angular dependence to reflectivity. In other words, the reflectivity for curve f is constant for all angles of incidence. At that point, equation 1 reduces to the angular independent form: (n2o−n1o)/(n2o+n1o). When n1z=n2z, there is no Brewster effect and there is constant reflectivity for all angles of incidence.

Figure 9:
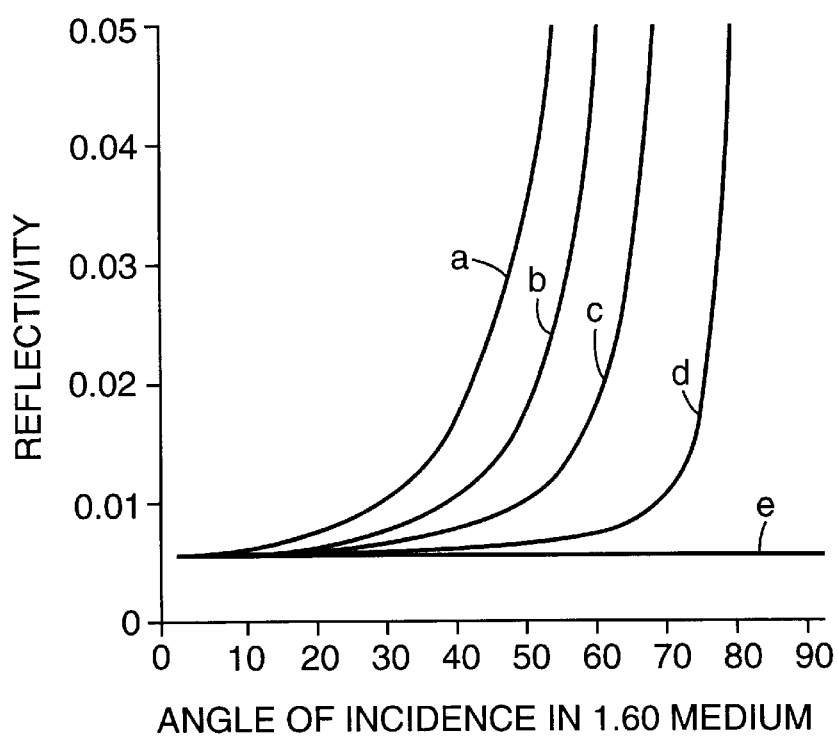

FIG. 9 shows reflectivity versus angle of incidence curves for cases where n1z is numerically less than or equal to n2z. Light is incident from isotropic medium to the birefringent layers. For these cases, the reflectivity monotonically increases with angle of incidence. This is the behavior that would be observed for s-polarized light. Curve a in FIG. 9 shows the single case for s polarized light. Curves b–e show cases for p polarized light for various values of nz, in the following order: b) n1z=1.50, n2z=1.60; c) n1z=1.55, n2z=1.60; d) n1z=1.59, n2z=1.60; and e) n1z=1.60=n2z. Again, when n1z=n2z (curve e), there is no Brewster effect, and there is constant reflectivity for all angles of incidence.

Figure 10:
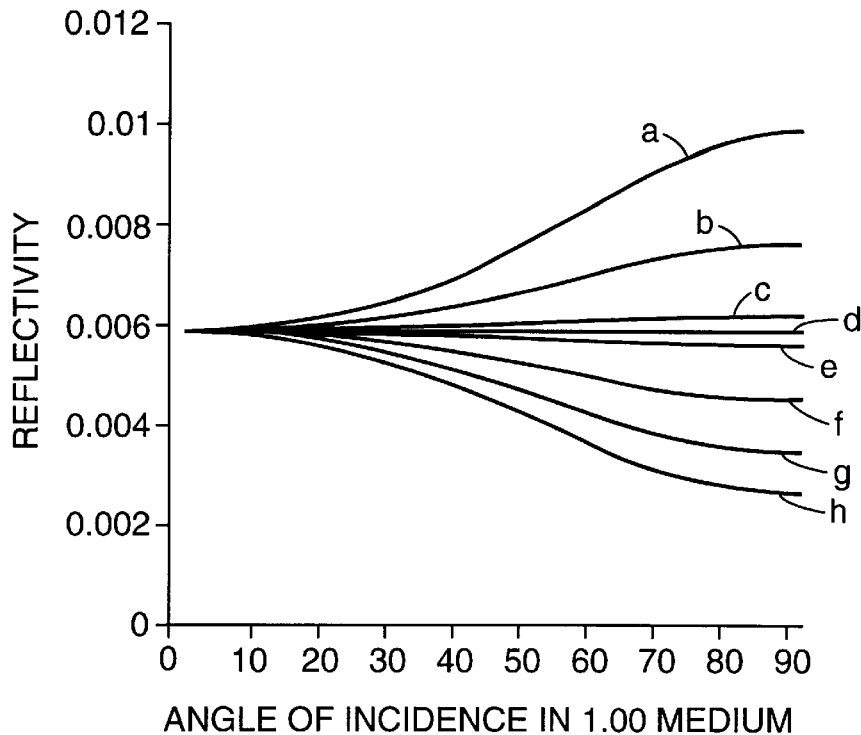
FIG. 10 shows reflectivity versus angle curves for a uniaxial birefringent system in a medium of index 1.0.

FIG. 10 shows the same cases as FIGS. 8 and 9 but for an incident medium of index no=1.0 (air). The curves in FIG. 10 are plotted for p polarized light at a single interface of a positive uniaxial material of indices n2x=n2y=1.50, n2z=1.60, and a negative uniaxially birefringent material with n1x=n1y=1.75, and values of n1z, in the following order, from top to bottom, of: a) 1.50; b) 1.55; c) 1.59; d) 1.60; f) 1.61; g) 1.65; h) 1.70; and i) 1.75. Again, as was shown in FIGS. 8 and 9, when the values of n1z and n2z match (curve d), there is no angular dependence to reflectivity.

FIGS. 8, 9 and 10 show that the cross-over from one type of behavior to another occurs when the z-axis index of one film equals the z-axis index of the other film. This is true for several combinations of negative and positive uniaxially birefringent, and isotropic materials. Other situations occur in which the Brewster angle is shifted to larger or smaller angles.

Figure 11:
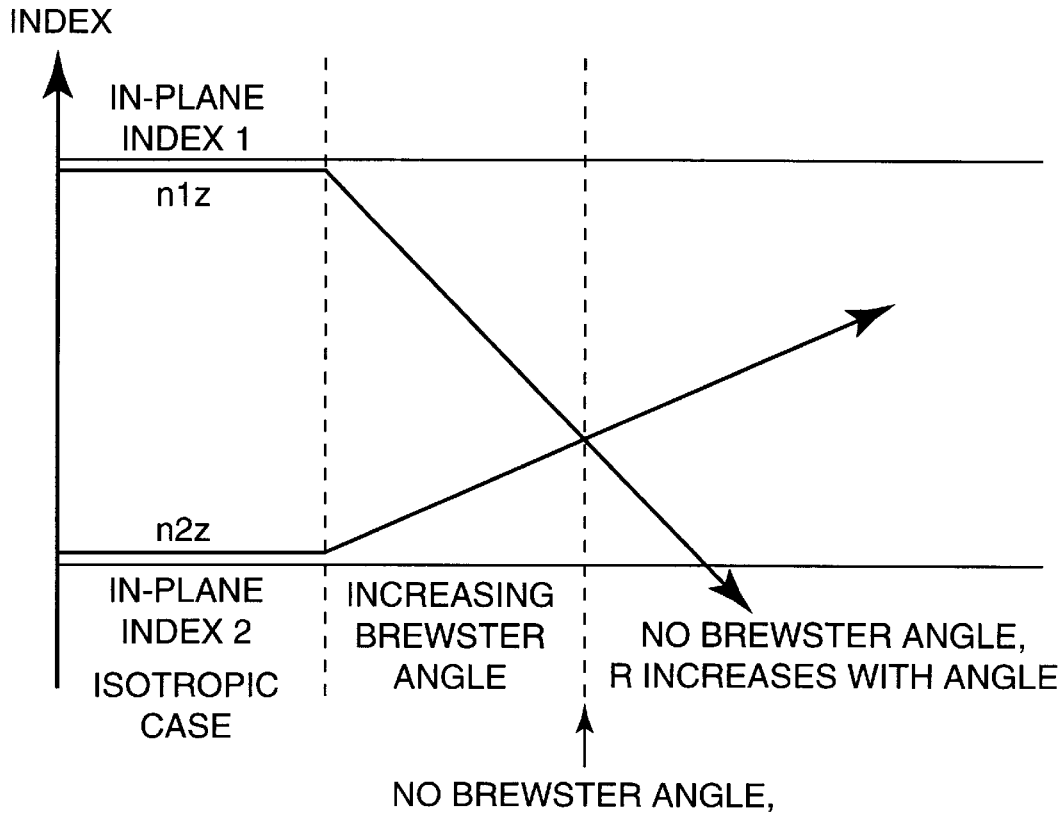
FIGS. 11, 12 and 13 show various relationships between in-plane indices and z-index for a uniaxial birefringent system.
Figure 12:
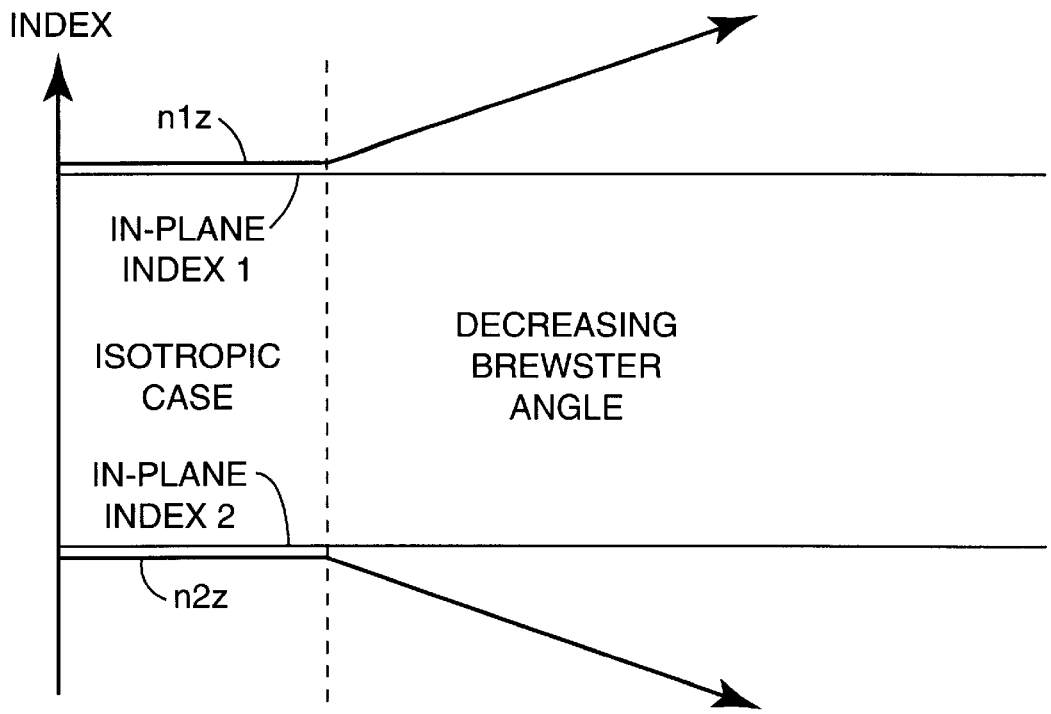
Figure 13:
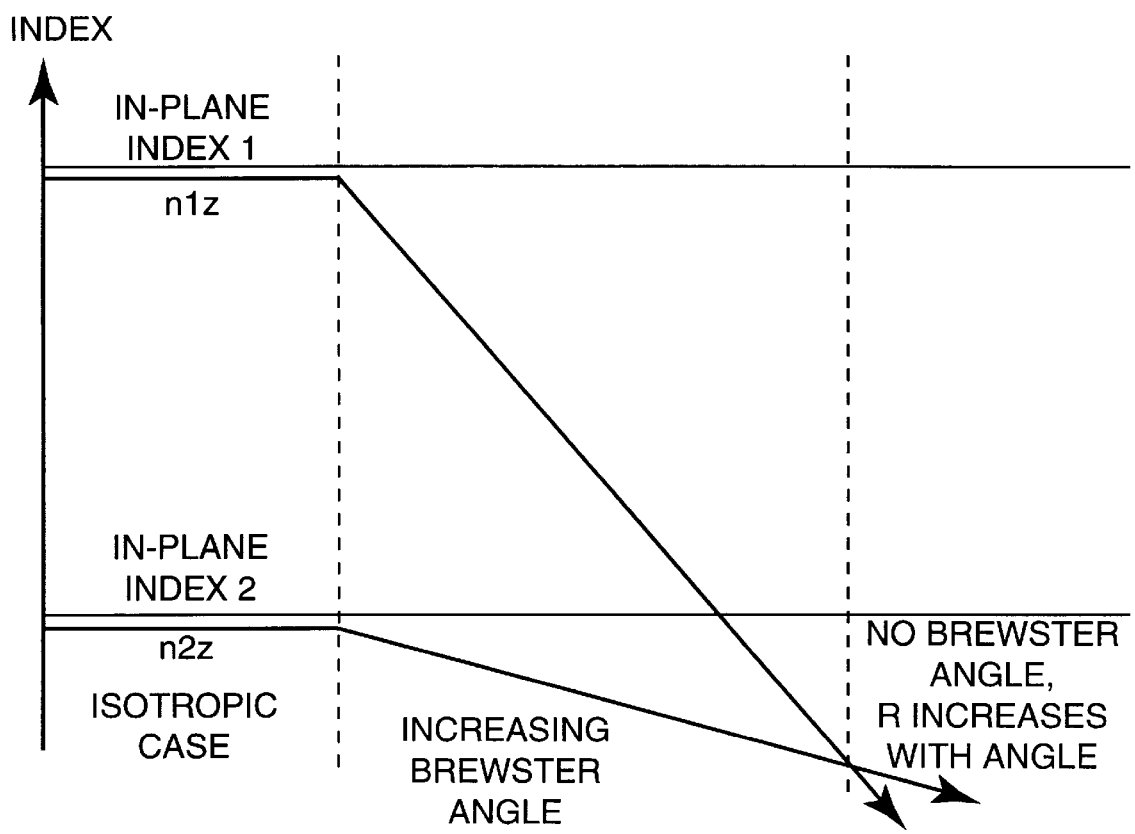

Various possible relationships between in-plane indices and z-axis indices are illustrated in FIGS. 11, 12 and 13. The vertical axes indicate relative values of indices and the horizontal axes are used to separate the various conditions. Each Figure begins at the left with two isotropic films, where the z-index equals the in-plane indices. As one proceeds to the right, the in-plane indices are held constant and the various z-axis indices increase or decrease, indicating the relative amount of positive or negative birefringence.

The case described above with respect to FIGS. 8, 9, and 10 is illustrated in FIG. 11. The in-plane indices of material one are greater than the in-plane indices of material two, material 1 has negative birefringence (n1z less than in-plane indices), and material two has positive birefringence (n2z greater than in-plane indices). The point at which the Brewster angle disappears and reflectivity is constant for all angles of incidence is where the two z-axis indices are equal. This point corresponds to curve f in FIG. 8, curve e in FIG. 9 or curve d in FIG. 10.

In FIG. 12, material one has higher in-plane indices than material two, but material one has positive birefringence and material two has negative birefringence. In this case, the Brewster minimum can only shift to lower values of angle.

Both FIGS. 11 and 12 are valid for the limiting cases where one of the two films is isotropic. The two cases are where material one is isotropic and material two has positive birefringence, or material two is isotropic and material one has negative birefringence. The point at which there is no Brewster effect is where the z-axis index of the birefringent material equals the index of the isotropic film.

Another case is where both films are of the same type, i.e., both negative or both positive birefringent. FIG. 13 shows the case where both films have negative birefringence. However, it shall be understood that the case of two positive birefringent layers is analogous to the case of two negative birefringent layers shown in FIG. 13. As before, the Brewster minimum is eliminated only if one z-axis index equals or crosses that of the other film.

Yet another case occurs where the in-plane indices of the two materials are equal, but the z-axis indices differ. In this case, which is a subset of all three cases shown in FIGS. 11–13, no reflection occurs for s polarized light at any angle, and the reflectivity for p polarized light increases monotonically with increasing angle of incidence. This type of article has increasing reflectivity for p-polarized light as angle of incidence increases, and is transparent to s-polarized light. This article can be referred to as a "p-polarizer".

The above described principles and design considerations describing the behavior of uniaxially birefringent systems can be applied to create multilayer stacks having the desired optical effects for a wide variety of circumstances and applications. The indices of refraction of the layers in the multilayer stack can be manipulated and tailored to produce devices having the desired optical properties. Many negative and positive uniaxial birefringent systems can be created with a variety of in-plane and z-axis indices, and many useful devices can be designed and fabricated using the principles described here.

Biaxial Birefringent Systems (Polarizers)

Referring again to FIG. 7, two component orthogonal biaxial birefringent systems and the design considerations affecting the resultant optical properties will now be described. Again, the system can have many layers, but an understanding of the optical behavior of the stack is achieved by examining the optical behavior at one interface.

A biaxial birefringent system can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result, the biaxial birefringent system acts as a polarizer, transmitting light of one polarization and reflecting light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Referring again to FIG. 7, the following values to the film indices are assigned for purposes of illustration: n1x=1.88, n1y=1.64, n1z=variable, n2x=1.65, n2y=variable, and n2z=variable. The x direction is referred to as the extinction direction and the y direction as the transmission direction.

Equation 1 can be used to predict the angular behavior of the biaxial birefringent system for two important cases of light with a plane of incidence in either the stretch (xz plane) or the non-stretch (yz plane) directions. The polarizer is a mirror in one polarization direction and a window in the other direction. In the stretch direction, the large index differential of 1.88−1.65=0.23 in a multilayer stack with hundreds of layers will yield very high reflectivities for s-polarized light. For p-polarized light the reflectance at various angles depends on the n1z/n2z index differential.

In many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a colored polarizer across a 100 nm bandwidth is desirably at least 50%, preferably at least 70% and more preferably at least 90%. The average transmission at 60 degrees from the normal for p-polarized light (measured along the transmission axis) for a narrow band polarizer across a 100 nm bandwidth is desirably at least 50%, preferably at least 70% and more preferably at least 80%.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis) for a polarizer from 400–700 nm is desirably at least 50%, preferably at least 70%, more preferably at least 80%, and even more preferably at least 90%.

For certain applications, high reflectivity in the transmission axis at off-normal angles are preferred. The average reflectivity for light polarized along the transmission axis should be more than 20% at an angle of at least 20 degrees from the normal.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{RMS} = \frac{\int_{\lambda 1}^{\lambda 2} ((T - \bar{T})^2)^{\frac{1}{2}} d\lambda}{\bar{T}}$$

where the range 11 to 12 is the wavelength range, or bandwidth, of interest, T is the transmissivity along the transmission axis, and $\bar{T}$ is the average transmissivity along the transmission axis in the wavelength range of interest.

For applications where a low color polarizer is desirable, the % RMS color should be less than 10%, preferably less than 8%, more preferably less than 3.5%, and even more preferably less than 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than 50%, preferably less than 30%, more preferably less than 10%, and even more preferably less than 3%. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Reflectivity at off-normal angles, for light with its plane of polarization parallel to the transmission axis may be caused by a large z-index mismatch, even if the in-plane y indices are matched. The resulting system thus has large reflectivity for p, and is highly transparent to s polarized light. This case was referred to above in the analysis of the mirror cases as a "p polarizer".

For uniaxially stretched polarizers, performance depends upon the relationships between the alternating layer indices for all three (x, y, and z) directions. As described herein, it is desirable to minimize the y and z index differentials for a high efficiency polarizer. Introduction of a y-index mismatch is describe to compensate for a z-index mismatch. Whether intentionally added or naturally occurring, any index mismatch will introduce some reflectivity. An important factor thus is making the x-index differential larger than the y- and z-index differentials. Since reflectivity increases rapidly as a function of index differential in both the stretch and non-stretch directions, the ratios Dny/Dnx and Dnz/Dnx should be minimized to obtain a polarizer having high extinction along one axis across the bandwidth of interest and also over a broad range of angles, while preserving high transmission along the orthogonal axis. Ratios of less than 0.05, 0.1 or 0.25 are acceptable. Ideally, the ratio Dnz/Dnx is 0, but ratios of less than 0.25 or 0.5 also produce a useable polarizer.

Figure 14:
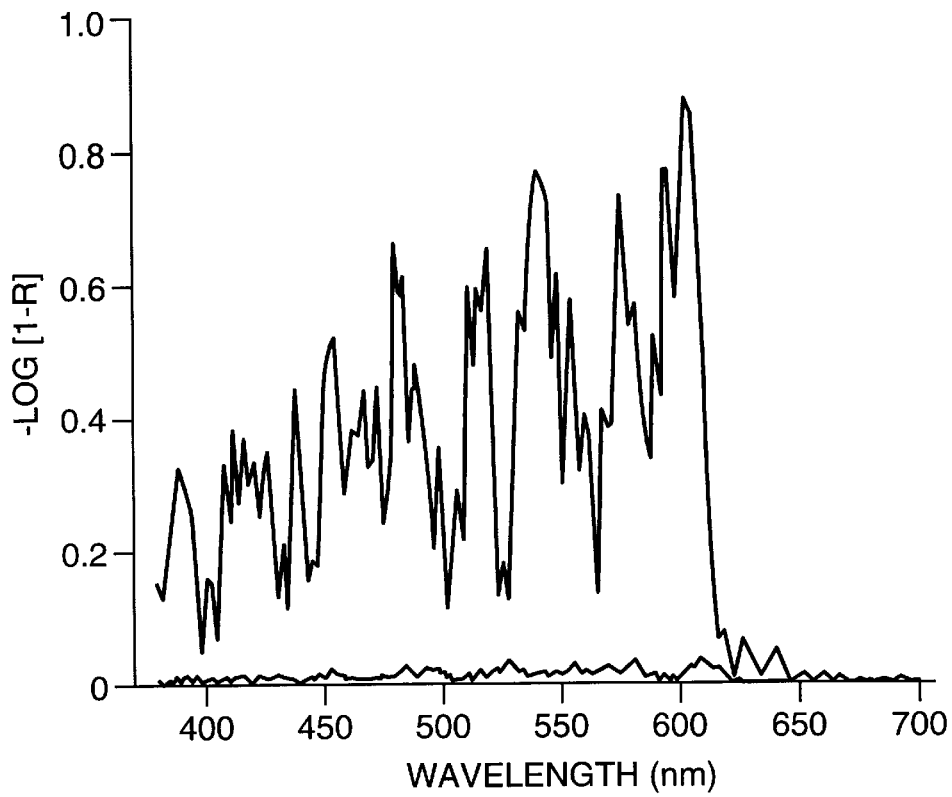
FIG. 14 shows off axis reflectivity versus wavelength for two different biaxial birefringent systems.

FIG. 14 shows the reflectivity (plotted as −Log[1−R]) at 75° for p polarized light with its plane of incidence in the non-stretch direction, for an 800 layer stack of PEN/coPEN. The reflectivity is plotted as function of wavelength across the visible spectrum (400–700 nm). The relevant indices for curve a at 550 nm are n1y=1.64, n1z=1.52, n2y=1.64 and n2z=1.63. The model stack design is a linear thickness grade for quarterwave pairs, where each pair thickness is given by $d_n = d_o + d_o(0.003)n$. All layers were assigned a random thickness error with a gaussian distribution and a 5% standard deviation.

Curve a shows high off-axis reflectivity across the visible spectrum along the transmission axis (the y-axis) and that different wavelengths experience different levels of reflectivity. This is due to the large z-index mismatch (Dnz=0.11). Since the spectrum is sensitive to layer thickness errors and spatial nonuniformities, such as film caliper, this gives a biaxial birefringent system with a very nonuniform and "colorful" appearance. Although a high degree of color may be desirable for certain applications, it is desirable to control the degree of off-axis color, and minimize it for those applications requiring a uniform, low color appearance, such as liquid crystal displays or other types of displays.

Off-axis reflectivity, and off-axis color can be minimized by introducing an index mismatch to the non-stretch in-plane indices (n1y and n2y) that create a Brewster condition off axis, while keeping the s-polarization reflectivity to a minimum.

Figure 15:
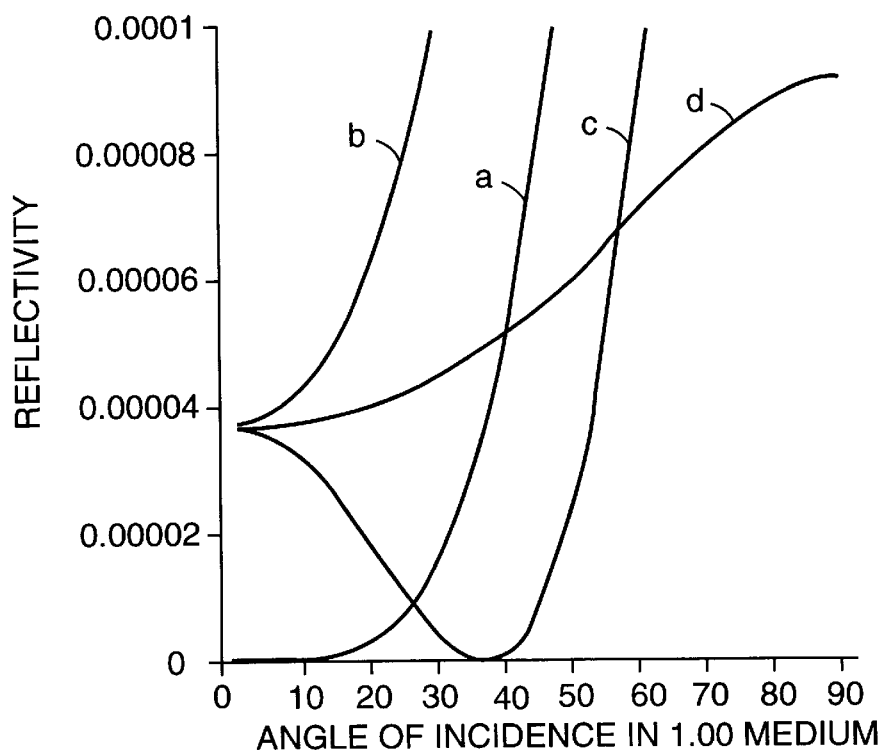
FIG. 15 shows the effect of introducing a y-index difference in a biaxial birefringent film with a large z-index difference.

FIG. 15 explores the effect of introducing a y-index mismatch in reducing off-axis reflectivity along the transmission axis of a biaxial birefringent system. With n1z=1.52 and n2z=1.63 (Dnz=0.11), the following conditions are plotted for p polarized light: a) n1y=n2y=1.64; b) n1y=1.64, n2y=1.62; c) n1y=1.64, n2y=1.66. Curve a shows the reflectivity where the in-plane indices n1y and n2y are equal. Curve a has a reflectance minimum at 0°, but rises steeply after 20°. For curve b, n1y>n2y, and reflectivity increases rapidly. Curve c, where n1y<n2y, has a reflectance minimum at 38°, but rises steeply thereafter. Considerable reflection occurs as well for s polarized light for n1y$^1$n2y, as shown by curve d. Curves a–d of FIG. 15 indicate that the sign of the y-index mismatch (n1y−n2y) should be the same as the z-index mismatch (n1z−n2z) for a Brewster minimum to exist. For the case of n1y=n2y, reflectivity for s polarized light is zero at all angles.

By reducing the z-axis index difference between layers, the off axis reflectivity can be further reduced. If n1z is equal to n2z, FIG. 10 indicates that the extinction axis will still have a high reflectivity off-angle as it does at normal incidence, and no reflection would occur along the non-stretch axis at any angle because both indices are matched (e.g., n1y=n2y and n1z=n2z).

Exact matching of the two y indices and the two z indices may not be possible in some multilayer systems. If the z-axis indices are not matched in a polarizer construction, introduction of a slight mismatch may be desired for in-plane indices n1y and n2y. This can be done by blending additional components into one or both of the material layers in order to increase or decrease the respective y index as described below in Example 15. Blending a second resin into either the polymer that forms the highly birefringent layers or into the polymer that forms the selected polymer layers may be done to modify reflection for the transmission axis at normal and off-normal angles, or to modify the extinction of the polarizer for light polarized in the extinction axis. The second, blended resin may accomplish this by modifying the crystallinity and the index of refraction of the polymer layers after orientation.

Figure 16:
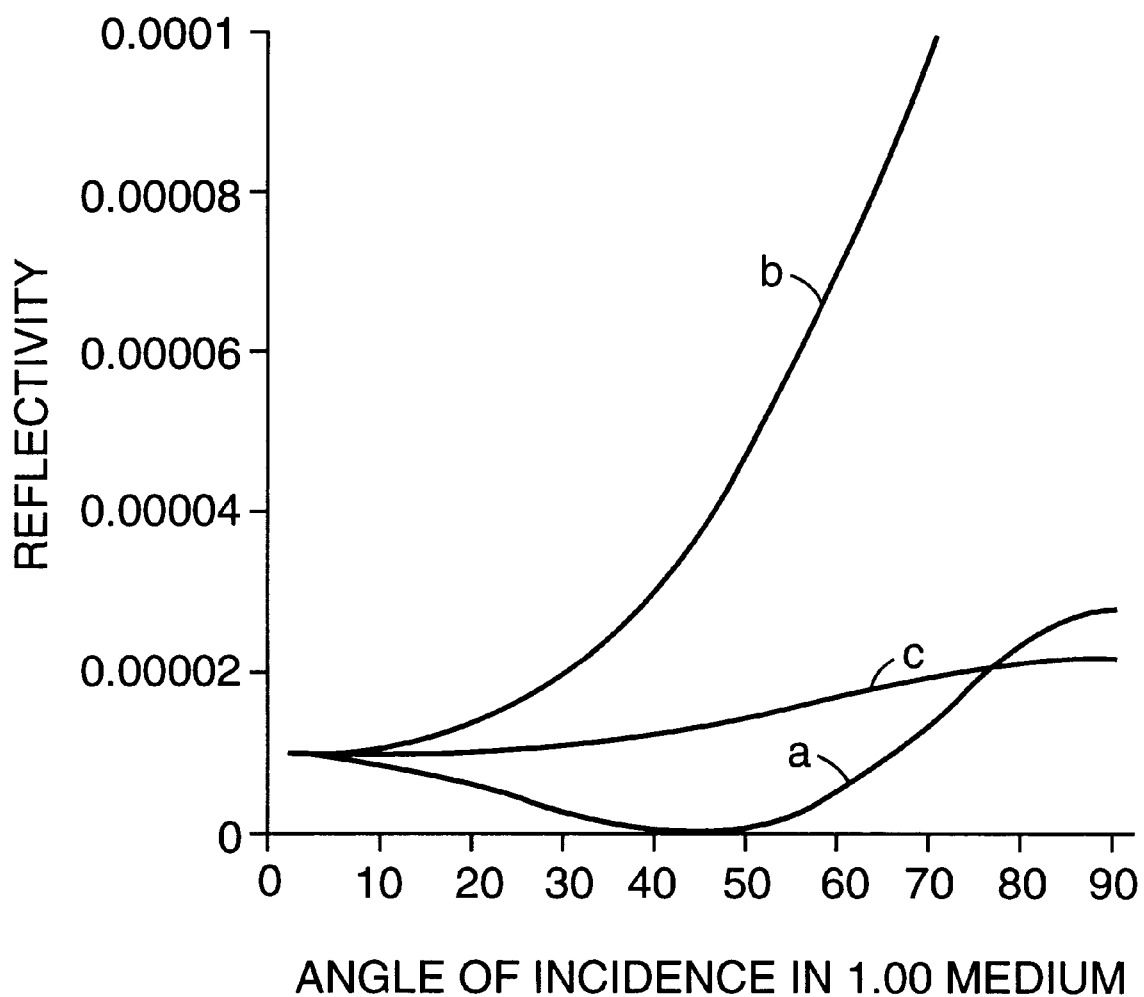
FIG. 16 shows the effect of introducing a y-index difference in a biaxial birefringent film with a smaller z-index difference.

Another example is plotted in FIG. 16, assuming n1z= 1.56 and n2z=1.60 (Dnz=0.04), with the following y indices a) n1y=1.64, n2y=1.65; b) n1y=1.64, n2y=1.63. Curve c is for s-polarized light for either case. Curve a, where the sign of the y-index mismatch is the same as the z-index mismatch, results in the lowest off-angle reflectivity.

The computed off-axis reflectance of an 800 layer stack of films at 75° angle of incidence with the conditions of curve a in FIG. 16 is plotted as curve b in FIG. 14. Comparison of curve b with curve a in FIG. 14 shows that there is far less off-axis reflectivity, and therefore lower perceived color and better uniformity, for the conditions plotted in curve b. The relevant indices for curve b at 550 nm are n1y=1.64, n1z=1.56, n2y=1.65 and n2z=1.60.

Figure 17:
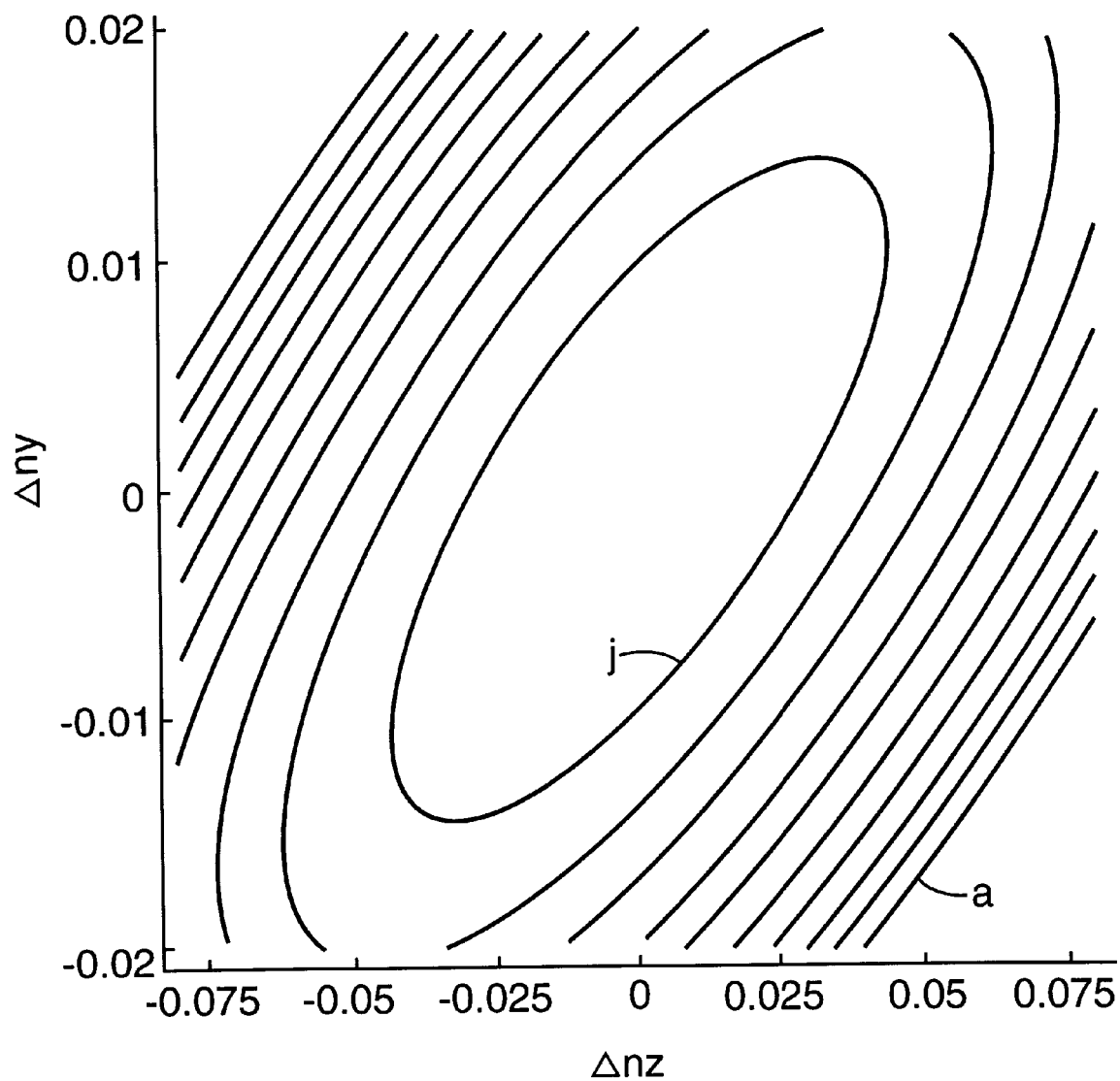
FIG. 17 shows a contour plot summarizing the information from FIGS. 15 and 16.

FIG. 17 shows a contour plot of equation 1 which summarizes the off axis reflectivity discussed in relation to FIG. 7 for p-polarized light. The four independent indices involved in the non-stretch direction have been reduced to two index mismatches, Dnz and Dny. The plot is an average of 6 plots at various angles of incidence from 0° to 75° in 15 degree increments. The reflectivity ranges from $0.4 \times 10^{-4}$ for contour a, to $4.0 \times 10^{-4}$ for contour j, in constant increments of $0.4 \times 10^{-4}$. The plots indicate how high reflectivity caused by an index mismatch along one optic axis can be offset by a mismatch along the other axis.

Thus, by reducing the z-index mismatch between layers of a biaxial birefringent systems, and/or by introducing a y-index mismatch to produce a Brewster effect, off-axis reflectivity, and therefore off-axis color, are minimized along the transmission axis of a multilayer reflecting polarizer.

It should also be noted that narrow band polarizers operating over a narrow wavelength range can also be designed using the principles described herein. These can be made to produce polarizers in the red, green, blue, cyan, magenta, or yellow bands, for example.

An ideal reflecting polarizer should transmit all light of one polarization, and reflect all light of the other polarization. Unless laminated on both sides to glass or to another film with a clear optical adhesive, surface reflections at the air/reflecting polarizer interface will reduce the transmission of light of the desired polarization. Thus, it may in some cases be useful to add an antireflection (AR) coating to the reflecting polarizer. The AR coating is preferably designed to dereflect a film of index 1.64 for PEN based polarizers in air, because that is the index of all layers in the nonstretch (y) direction. The same coating will have essentially no effect on the stretch direction because the alternating index stack of the stretch direction has a very high reflection coefficient irrespective of the presence or absence of surface reflections. Any AR coating known in the art could be applied, provided that the coating does not overheat or damage the multilayer film being coated. An exemplary coating would be a quarterwave thick coating of low index material, ideally with index near the square root of 1.64 (for PEN based materials).

Materials Selection and Processing

With the above-described design considerations established, one of ordinary skill will readily appreciate that a wide variety of materials can be used to form multilayer mirrors or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of mirrors include PET/Ecdel, PEN/Ecdel, PEN/sPS, PEN/

THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from 3M Co.

The number of layers in the device is selected to achieve the desired optical properties using the minimum number of layers for reasons of film thickness, flexibility and economy. In the case of both polarizers and mirrors, the number of layers is preferably less than 10,000, more preferably less than 5,000, and (even more preferably) less than 2,000.

As discussed above, the ability to achieve the desired relationships among the various indices of refraction (and thus the optical properties of the multilayer device) is influenced by the processing conditions used to prepare the multilayer device. In the case of organic polymers which can be oriented by stretching, the devices are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirrors the film is stretched substantially in two directions (biaxial orientation).

The film may be allowed to dimensionally relax in the cross-stretch direction from the natural reduction in cross-stretch (equal to the square root of the stretch ratio) to being constrained (i.e., no substantial change in cross-stretch dimensions). The film may be stretched in the machine direction, as with a length orienter, in width using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratios in the range from 1:2 to 1:10 (more preferably 1:3 to 1:7) in the stretch direction and from 1:0.5 to 1:10 (more preferably from 1:0.5 to 1:7) orthogonal to the stretch direction is preferred.

Suitable multilayer devices may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

The invention will now be described by way of the following examples. In the examples, because optical absorption is negligible, reflection equals 1 minus transmission (R=1−T).

EXAMPLE 1

Polarizer

PEN and a 70 naphthalate/30 terephthalate copolyester (coPEN) were synthesized in a standard polyester resin kettle using ethylene glycol as the diol. The intrinsic viscosity of both the PEN and the coPEN was approximately 0.6 dl/g. Single layer films of PEN and coPEN were extruded and then uniaxially stretched, with the sides restrained, at approximately 150° C. As extruded, the PEN exhibited an isotropic refractive index of about 1.65, and the coPEN was characterized by an isotropic refractive index of about 1.64. By isotropic is meant that the refractive indices associated with all axes in the plane of the film are substantially equal. Both refractive index values were observed at 550 nm. After stretching at a 5:1 stretch ratio, the refractive index of the PEN associated with the oriented axis increased to approximately 1.88. The refractive index associated with the transverse axis dropped slightly to 1.64. The refractive index of the coPEN film after stretching at a 5:1 stretch ratio remained isotropic at approximately 1.64.

A satisfactory multilayer polarizer was then made of alternating layers of PEN and coPEN by coextrusion using a 51-slot feed block which fed a standard extrusion die. The extrusion was run at approximately 295° C. The PEN was extruded at approximately 23 lb/hr and the coPEN was extruded at approximately 22.3 lb/hr. The PEN skin layers were approximately three times as thick as the layers within the extruded film stack. All internal layers were designed to have an optical ¼ wavelength thickness for light of about 1300 nm. The 51-layer stack was extruded and cast to a thickness of approximately 0.0029 inches, and then uniaxially stretched with the sides restrained at approximately a 5:1 stretch ratio at approximately 150° C. The stretched film had a thickness of approximately 0.0005 inches.

The stretched film was then heat set for 30 seconds at approximately 230° C. in an air oven. The optical spectra were essentially the same for film that was stretched and for film that was subsequently heat set.

EXAMPLE 2

Polarizer

A satisfactory 204-layered polarizer was made by extruding PEN and coPEN in the 51-slot feedblock as described in Example 1 and then employing two layer doubling multipliers in series in the extrusion. The multipliers divide the extruded material exiting the feed block into two half-width flow streams, then stack the half-width flow streams on top of each other. U.S. Pat. No. 3,565,985 describes similar coextrusion multipliers. The extrusion was performed at approximately 295° C. using PEN at an intrinsic viscosity of 0.50 dl/g at 22.5 lb/hr while the coPEN at an intrinsic viscosity of 0.60 dl/g was run at 16.5 lb/hr. The cast web was approximately 0.0038 inches in thickness and was uniaxially stretched at a 5:1 ratio in a longitudinal direction with the sides restrained at an air temperature of 140° C. during stretching. Except for skin layers, all pairs of layers were designed to be ½ wavelength optical thickness for 550 nm light.

Two 204-layer polarizers made as described above were then hand-laminated using an optical adhesive to produce a 408-layered film stack. Preferably the refractive index of the adhesive should match the index of the isotropic coPEN layer.

EXAMPLE 3

PET:Ecdel, 601, Mirror

A coextruded film containing 601 layers was made on a sequential flat-film-making line via a coextrusion process. A Polyethylene terephthalate (PET) with an Intrinsic Viscosity of 0.6 dl/g (60 wt. % phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method (such as that described in U.S. Pat. No. 3,801,429) was used to generate 151 layers which was passed through two multipliers producing an extrudate of 601 layers. U.S. Pat. No. 3,565,985 describes exemplary coextrusion multipliers. The web was length oriented to a draw ratio of about 3.6 with the web temperature at about 210° F. The film was subsequently preheated to about 235° F. in about 50 seconds and drawn in the transverse direction to a draw ratio of about 4.0 at a rate of about 6% per second. The film was then relaxed about 5% of its maximum width in a heat-set oven set at 400° F. The finished film thickness was 2.5 mil.

Figure 18:
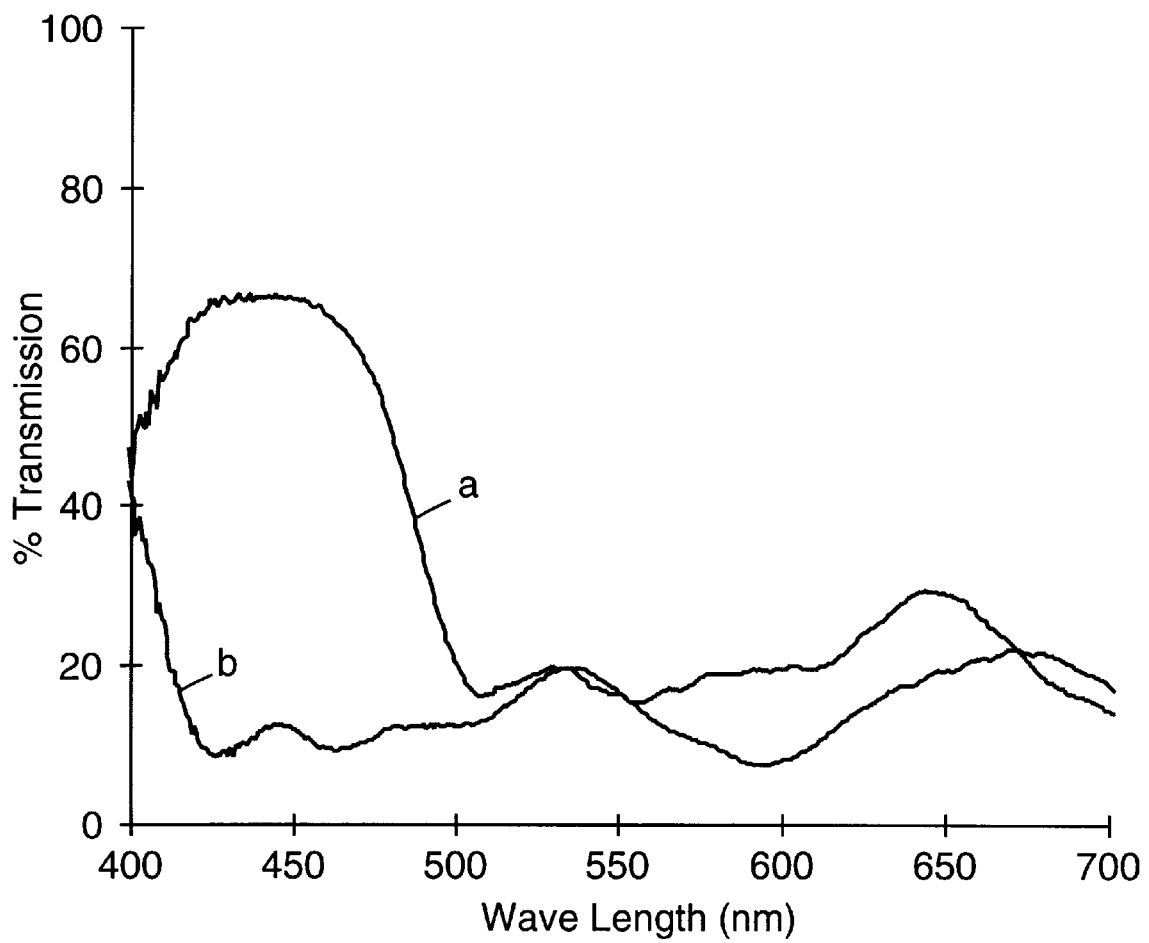
FIGS. 18, 19, 20, 21, 22 and 23 show optical performance of multilayer mirrors given in Examples 3–6.

The cast web produced was rough in texture on the air side, and provided the transmission as shown in FIG. 18. The % transmission for p-polarized light at a 60° angle (curve b) is similar the value at normal incidence (curve a) (with a wavelength shift).

Figure 19:
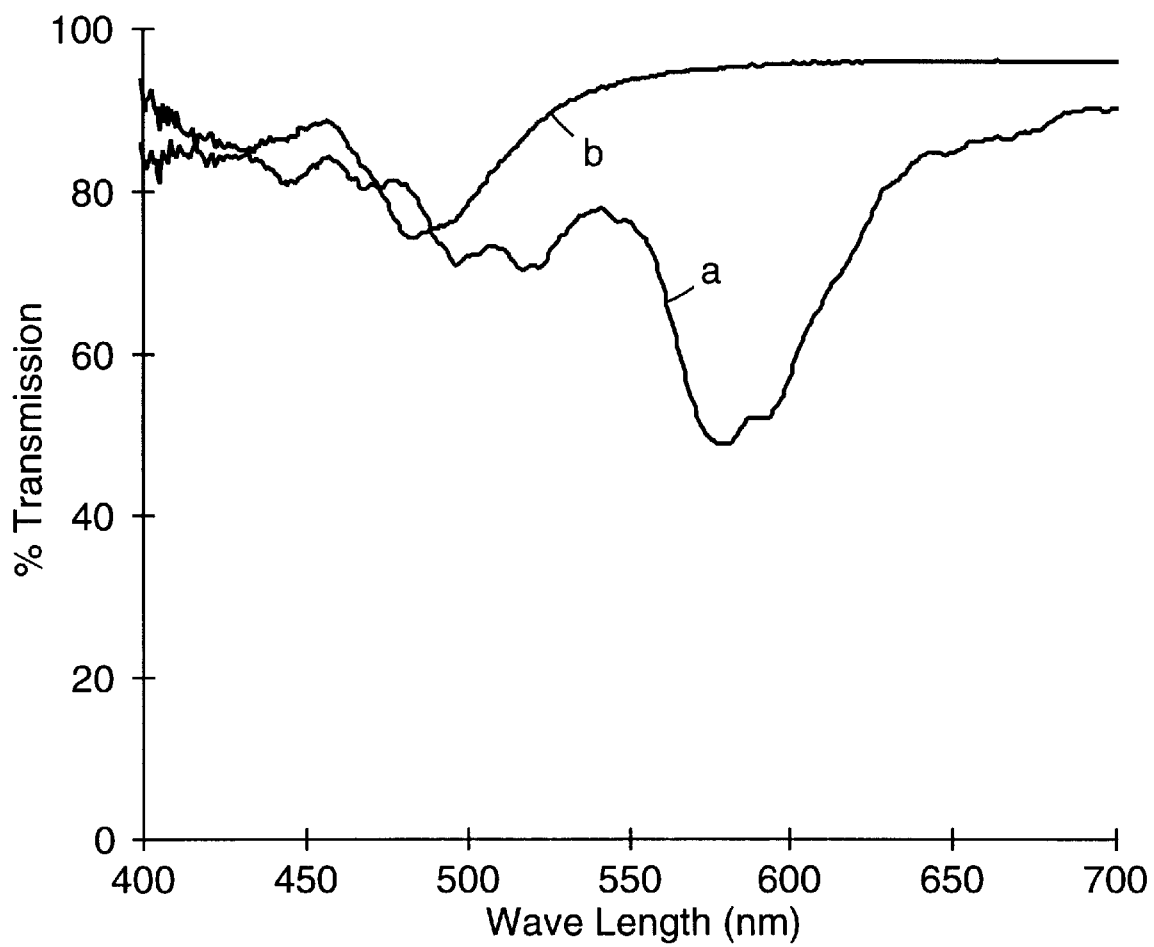

For comparison, film made by Mearl Corporation, presumably of isotropic materials (see FIG. 19) shows a noticeable loss in reflectivity for p-polarized light at a 60° angle (curve b, compared to curve a for normal incidence).

EXAMPLE 4

PET:Ecdel, 151, Mirror

A coextruded film containing 151 layers was made on a sequential flat-film-making line via a coextrusion process. A Polyethylene terephthalate (PET) with an Intrinsic Viscosity of 0.6 dl/g (60 wt phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method was used to generate 151 layers. The web was length oriented to a draw ratio of about 3.5 with the web temperature at about 210° F. The film was subsequently preheated to about 215° F. in about 12 seconds and drawn in the transverse direction to a draw ratio of about 4.0 at a rate of about 25% per second. The film was then relaxed about 5% of its maximum width in a heat-set oven set at 400° F. in about 6 seconds. The finished film thickness was about 0.6 mil.

Figure 20:
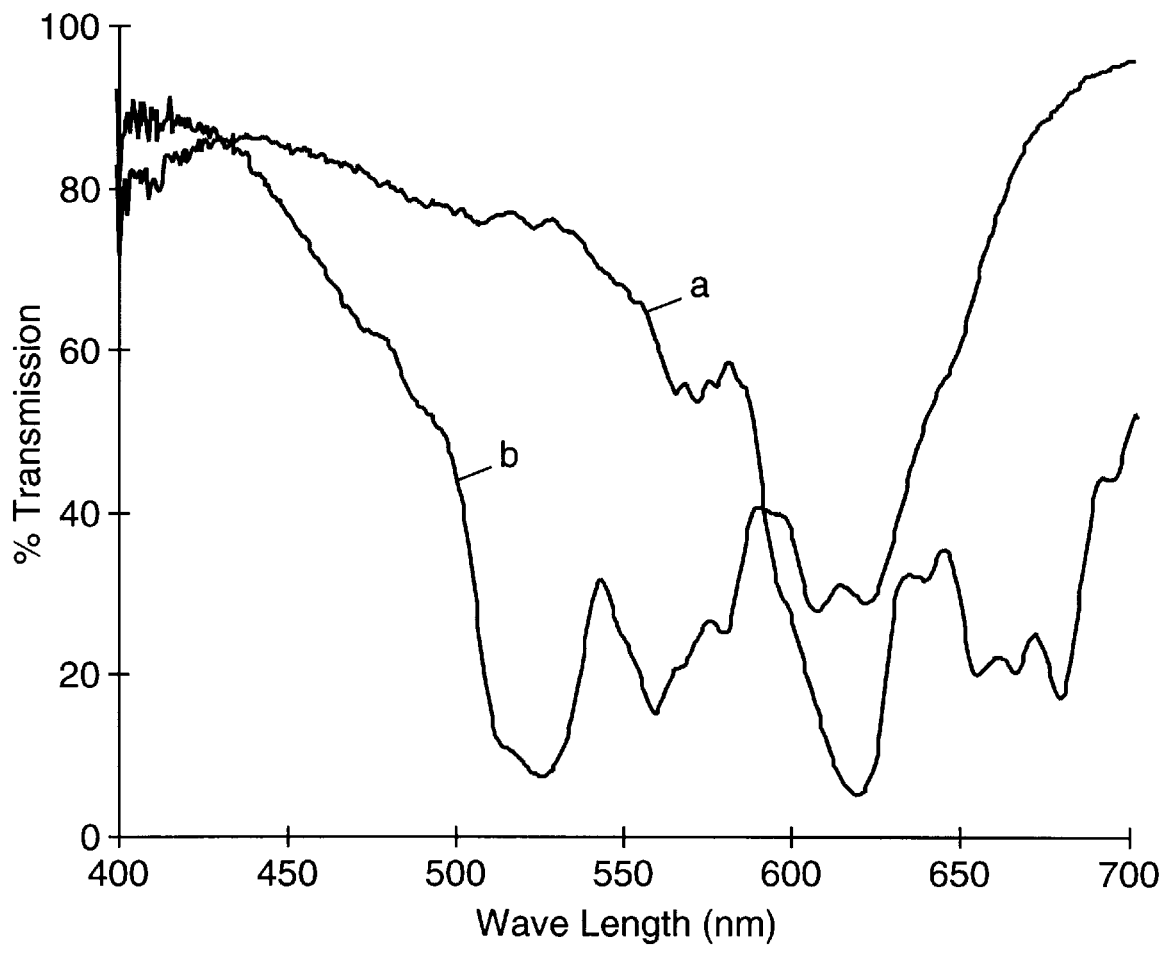
Figure 21:
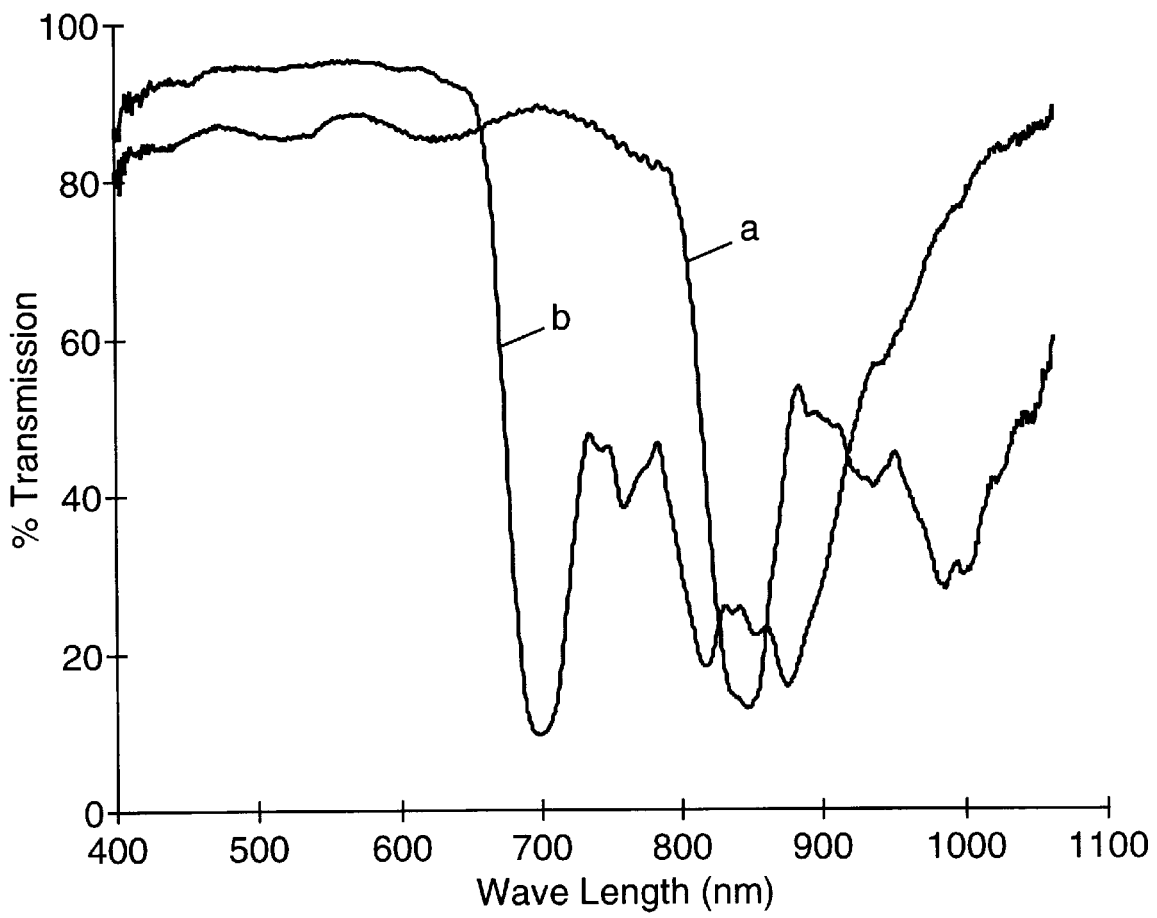

The transmission of this film is shown in FIG. 20. The % transmission for p-polarized light at a 60° angle (curve b) is similar the value at normal incidence (curve a) with a wavelength shift. At the same extrusion conditions the web speed was slowed down to make an infrared reflecting film with a thickness of about 0.8 mils. The transmission is shown in FIG. 21 (curve a at normal incidence, curve b at 60 degrees).

EXAMPLE 5

PEN:Ecdel, 225, Mirror

A coextruded film containing 225 layers was made by extruding the cast web in one operation and later orienting the film in a laboratory film-stretching apparatus. A Polyethylene naphthalate (PEN) with an Intrinsic Viscosity of 0.5 dl/g (60 wt. % phenol/40 wt. % dichlorobenzene) was delivered by one extruder at a rate of 18 pounds per hour and Ecdel 9966 (a thermoplastic elastomer available from Eastman Chemical) was delivered by another extruder at a rate of 17 pounds per hour. The PEN was on the skin layers. The feedblock method was used to generate 57 layers which was passed through two multipliers producing an extrudate of 225 layers. The cast web was 12 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 130° C. in 60 seconds. Stretching then commenced at 100%/sec (based on original dimensions) until the sample was stretched to about 3.5×3.5. Immediately after the stretching the sample was cooled by blowing room temperature air on it.

Figure 22:
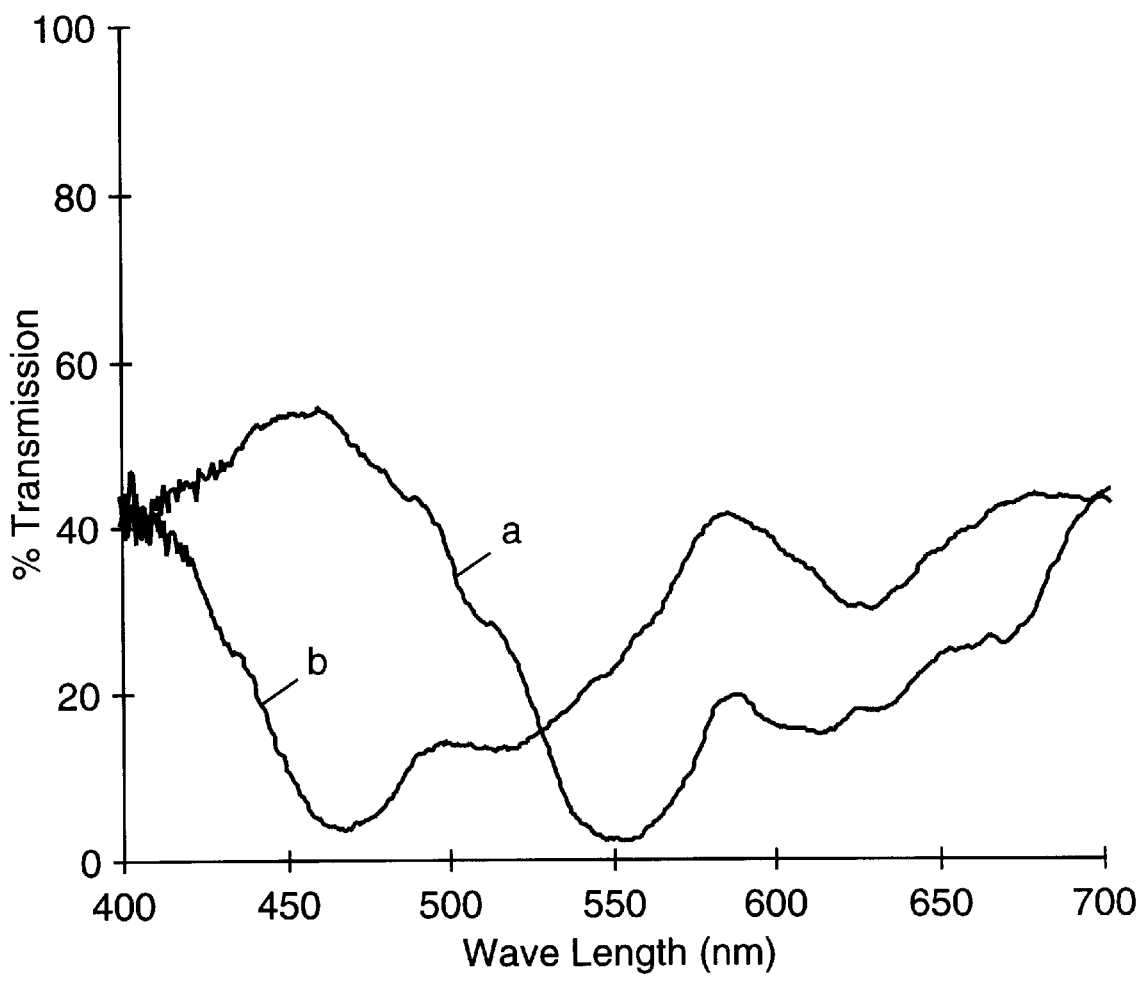

FIG. 22 shows the optical response of this multilayer film (curve a at normal incidence, curve b at 60 degrees). Note that the % transmission for p-polarized light at a 60° angle is similar to what it is at normal incidence (with some wavelength shift).

EXAMPLE 6

PEN:THV 500, 449, Mirror

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 23:
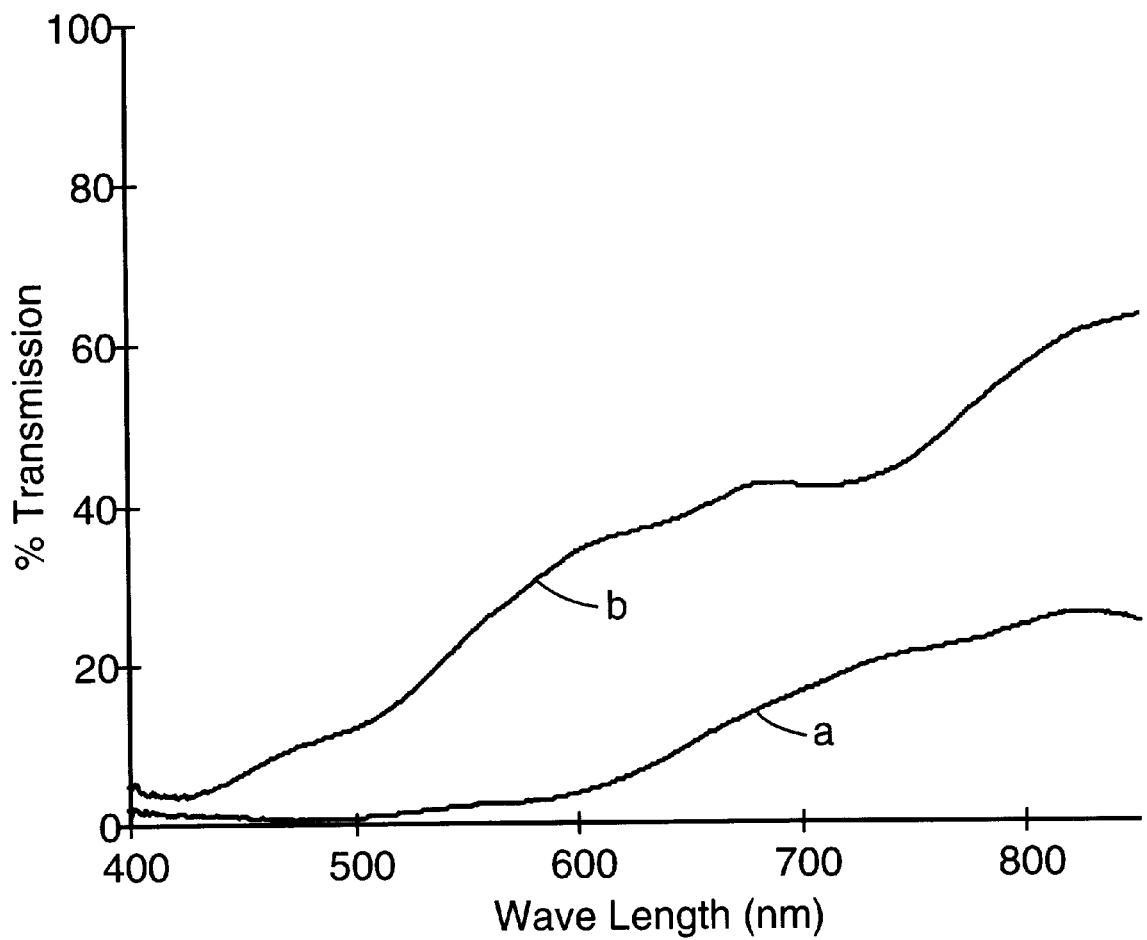

FIG. 23 shows the transmission of this multilayer film. Again, curve a shows the response at normal incidence, while curve b shows the response at 60 degrees.

EXAMPLE 7

PEN:CoPEN, 449—Low Color Polarizer

A coextruded film containing 449 layers was made by extruding the cast web in one operation and later orienting the film in a laboratory film-stretching apparatus. A Polyethylene naphthalate (PEN) with an Intrinsic Viscosity of 0.56 dl/g (60 wt. % phenol/40 wt. % dichlorobenzene) was delivered by one extruder at a rate of 43 pounds per hour and a CoPEN (70 mol % 2,6 NDC and 30 mol % DMT) with an intrinsic viscosity of 0.52 (60 wt. % phenol/40 wt. % dichlorobenzene) was delivered by another extruder at a rate of 25 pounds per hour. The PEN was on the skin layers and 40% of the PEN was present in the two skin layers. The feedblock method was used to generate 57 layers which was passed through three multipliers producing an extrudate of 449 layers. The cast web was 10 mils thick and 12 inches wide. The web was later uniaxially oriented using a laboratory stretching device that uses a pantograph to grip a square section of film and stretch it in one direction while it is constrained in the other at a uniform rate. A 7.46 cm square of web was loaded into the stretcher at about 100° C. and heated to 140° C. in 60 seconds. Stretching then commenced at 10%/sec (based on original dimensions) until the sample was stretched to about 5.5×1. Immediately after the stretching the sample was cooled by blowing room temperature air at it.

Figure 24:
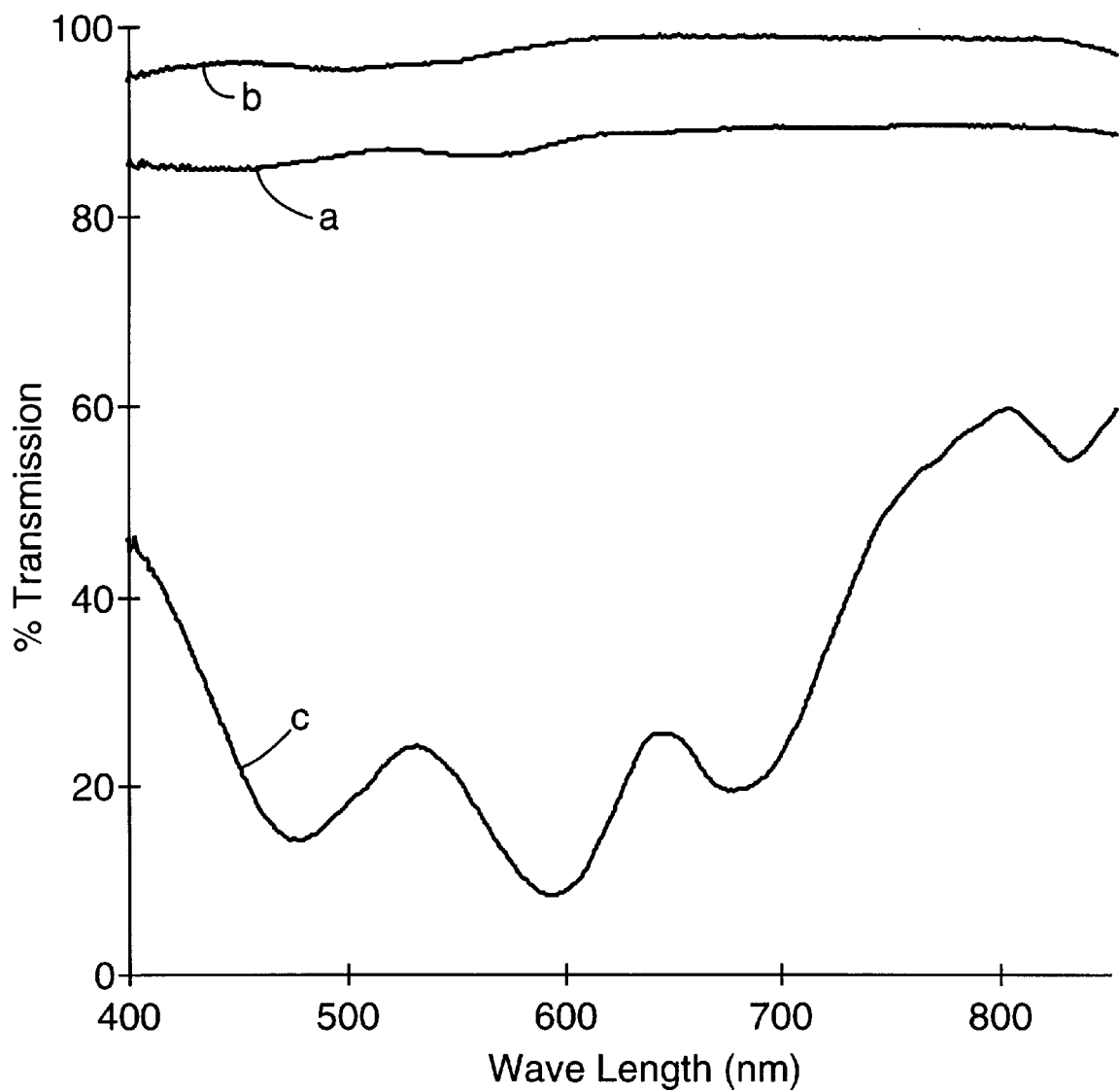
FIGS. 24, 25, 26, 27 and 28 show optical performance of multilayer polarizers given in Examples 7–11.

FIG. 24 shows the transmission of this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of light polarized in the non-stretch direction at both normal and 60° incidence. Average transmission for curve a over 400–700 nm is 87.1%, while average transmission for curve b over 400–700 nm is 97.1%. Transmission is higher for p-polarized light at 60° incidence because the air/PEN interface has a Brewster angle near 60°, so the transmission at 60° incidence is nearly 100%. Also note the high extinction of light polarized in the stretched direction in the visible range (400–700 nm) shown by curve c, where the average transmission is 21.0%. The % RMS color for curve a is 1.5%. The % RMS color for curve b is 1.4%.

EXAMPLE 8

PEN:CoPEN, 601—High Color Polarizer

A coextruded film containing 601 layers was produced by extruding the web and two days later orienting the film on a different tenter than described in all the other examples. A Polyethylene Naphthalate (PEN) with an Intrinsic Viscosity of 0.5 dl/g (60 wt. % phenol/40 wt. % dichlorobenzene) was delivered by one extruder at a rate of 75 pounds per hour and a CoPEN (70 mol % 2,6 NDC and 30 mol % DMT) with an IV of 0.55 dl/g (60 wt. % phenol/40 wt. % dichlorobenzene) was delivered by another extruder at a rate of 65 pounds per hour. The PEN was on the skin layers. The feedblock method was used to generate 151 layers which was passed through two multipliers producing an extrudate of 601 layers. U.S. Pat. No. 3,565,985 describes similar coextrusion multipliers. All stretching was done in the tenter. The film was preheated to about 280° F. in about 20 seconds and drawn in the transverse direction to a draw ratio of about 4.4 at a rate of about 6% per second. The film was then relaxed about 2% of its maximum width in a heat-set oven set at 460° F. The finished film thickness was 1.8 mil.

Figure 25:
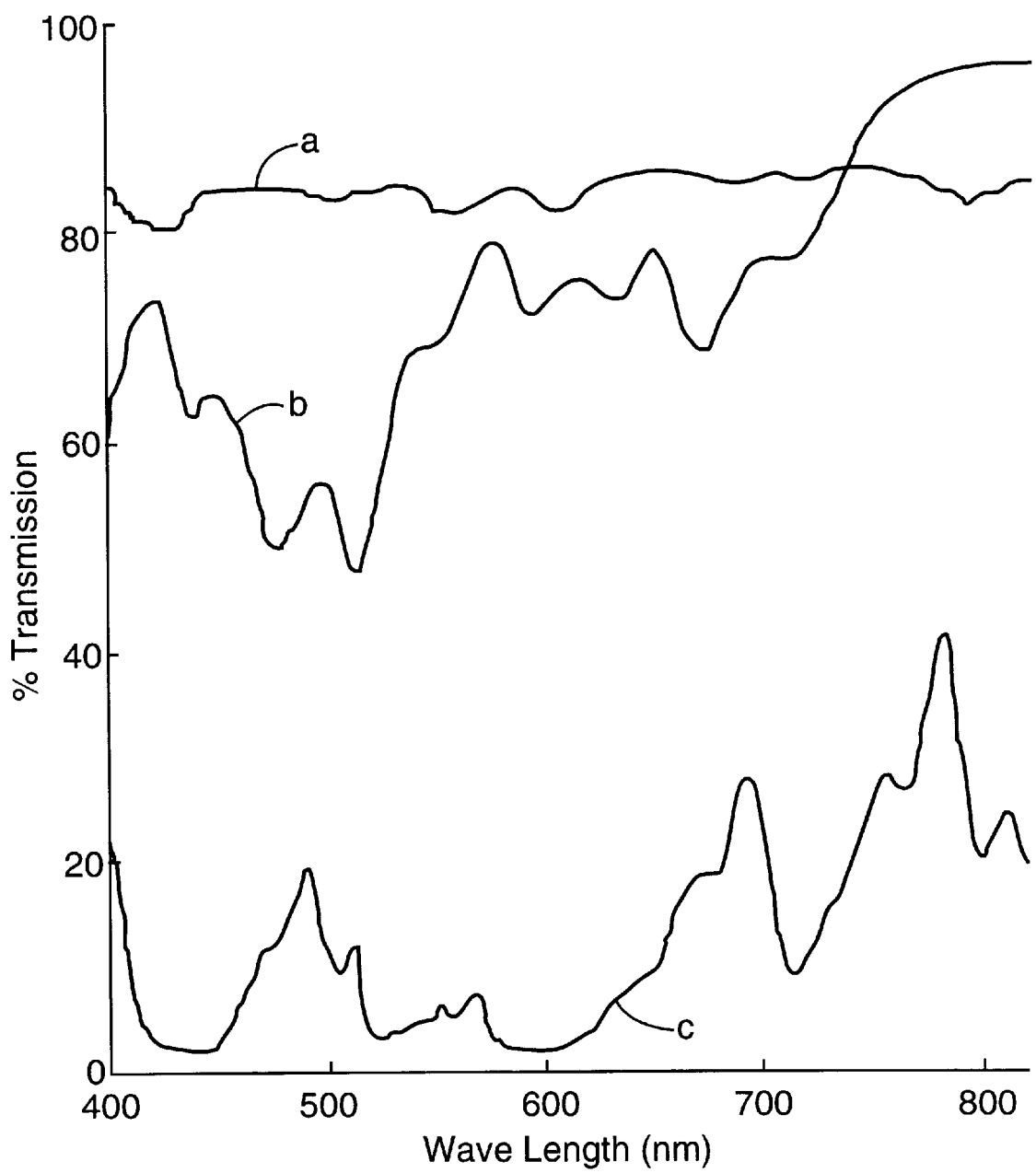

The transmission of the film is shown in FIG. 25. Curve a shows transmission of light polarized in the non-stretch direction at normal incidence, curve b shows transmission of p-polarized light at 60° incidence, and curve c shows transmission of light polarized in the stretch direction at normal incidence. Note the nonuniform transmission of p-polarized light at both normal and 60° incidence. The average transmission for curve a over 400–700 nm is 84.1%, while the average transmission for curve b over 400–700 nm is 68.2%. The average transmission for curve c is 9.1%. The % RMS color for curve a is 1.4%, and the % RMS color for curve b is 11.2%.

EXAMPLE 9

PET:CoPEN, 449, Polarizer

A coextruded film containing 449 layers was made by extruding the cast web in one operation and later orienting the film in a laboratory film-stretching apparatus. A Polyethylene Terephthalate (PET) with an Intrinsic Viscosity of 0.60 dl/g (60 wt. % phenol/40 wt. % dichlorobenzene) was delivered by one extruder at a rate of 26 pounds per hour and a CoPEN (70 mol % 2,6 NDC and 30 mol % DMT) with an intrinsic viscosity of 0.53 (60 wt. % phenol/40 wt. % dichlorobenzene) was delivered by another extruder at a rate of 24 pounds per hour. The PET was on the skin layers. The feedblock method was used to generate 57 layers which was passed through three multipliers producing an extrudate of 449 layers. U.S. Pat. No. 3,565,985 describes similar coextrusion multipliers. The cast web was 7.5 mils thick and 12 inches wide. The web was later uniaxially oriented using a laboratory stretching device that uses a pantograph to grip a square section of film and stretch it in one direction while it is constrained in the other at a uniform rate. A 7.46 cm square of web was loaded into the stretcher at about 100° C. and heated to 120° C. in 60 seconds. Stretching then commenced at 10%/sec (based on original dimensions) until the sample was stretched to about 5.0×1. Immediately after the stretching the sample was cooled by blowing room temperature air at it. The finished film thickness was about 1.4 mil. This film had sufficient adhesion to survive the orientation process with no delamination.

Figure 26:
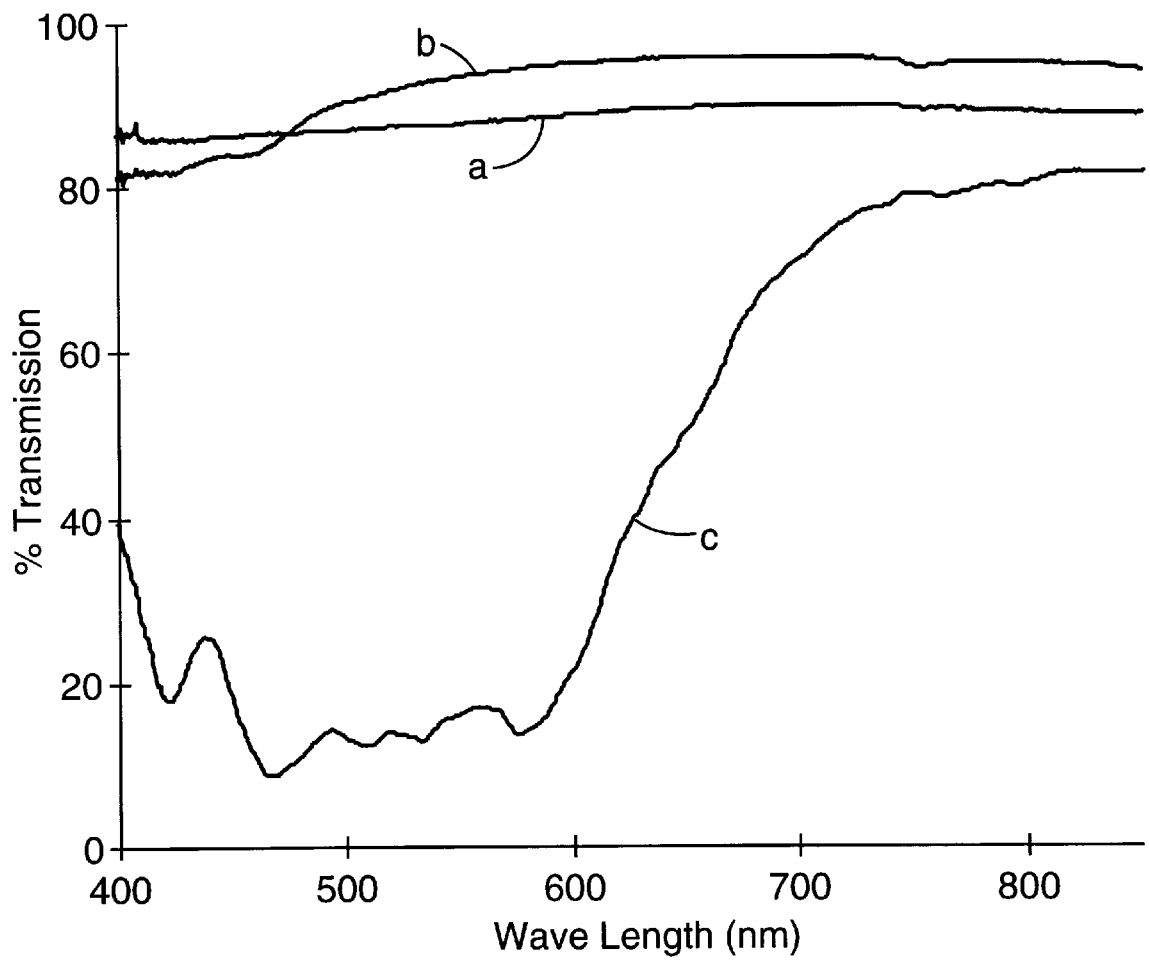

FIG. 26 shows the transmission of this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. The average transmission for curve a over 400–700 nm is 88.0%, and the average transmission for curve b over 400–700 nm is 91.2%. The average transmission for curve c over 400–700 nm is 27.9%. The % RMS color for curve a is 1.4%, and the % RMS color for curve b is 4.8%.

EXAMPLE 10

PEN:CoPEN, 601, Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a gradient distribution of layers with a ration of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 27:
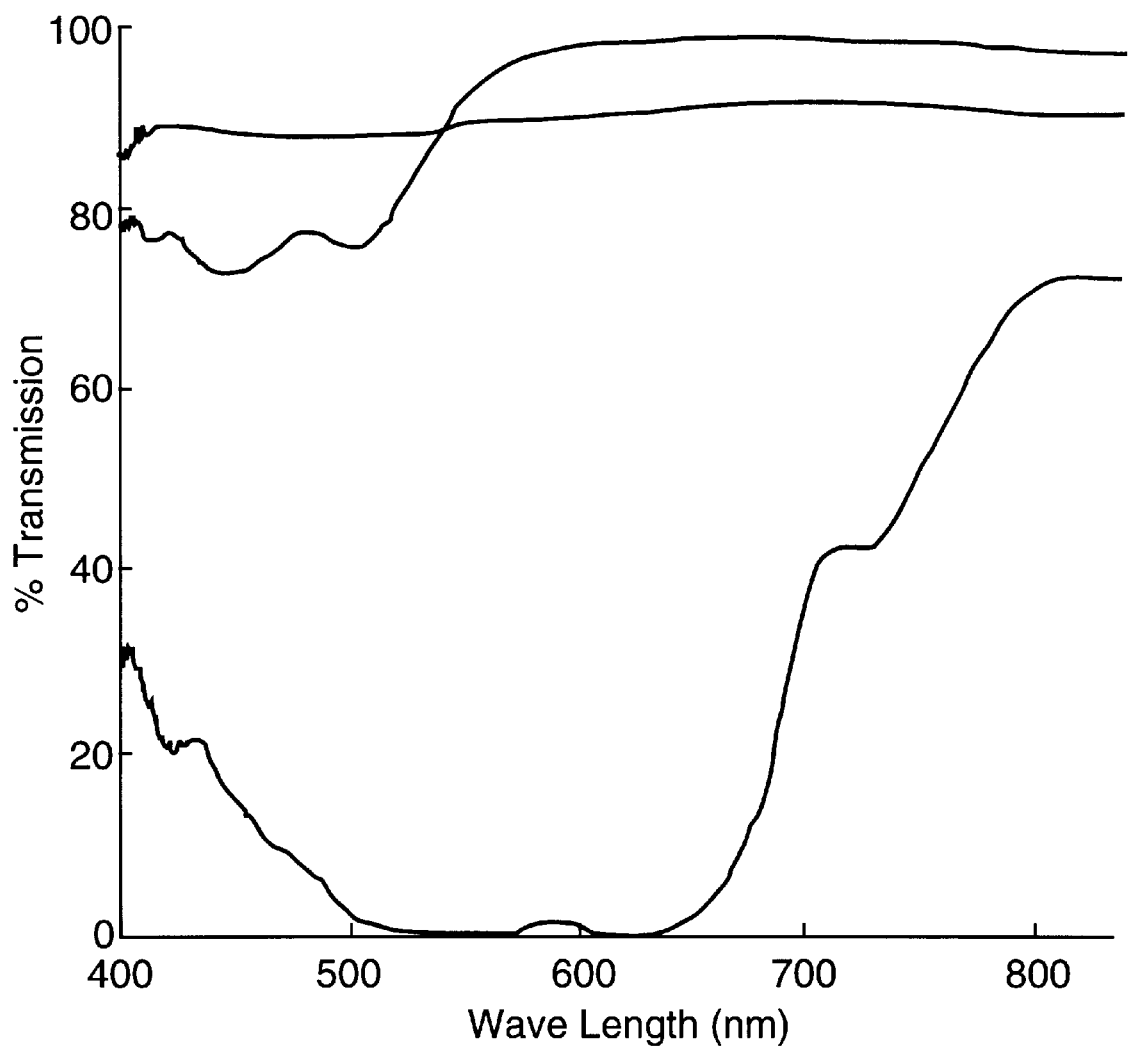

FIG. 27 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence (80–100%). Also note the very high extinction of light polarized in the stretched direction in the visible range (400–700 nm) shown by curve c. Extinction is nearly 100% between 500 and 650 nm.

EXAMPLE 11

PEN:sPS, 481, Polarizer

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness or about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 28:
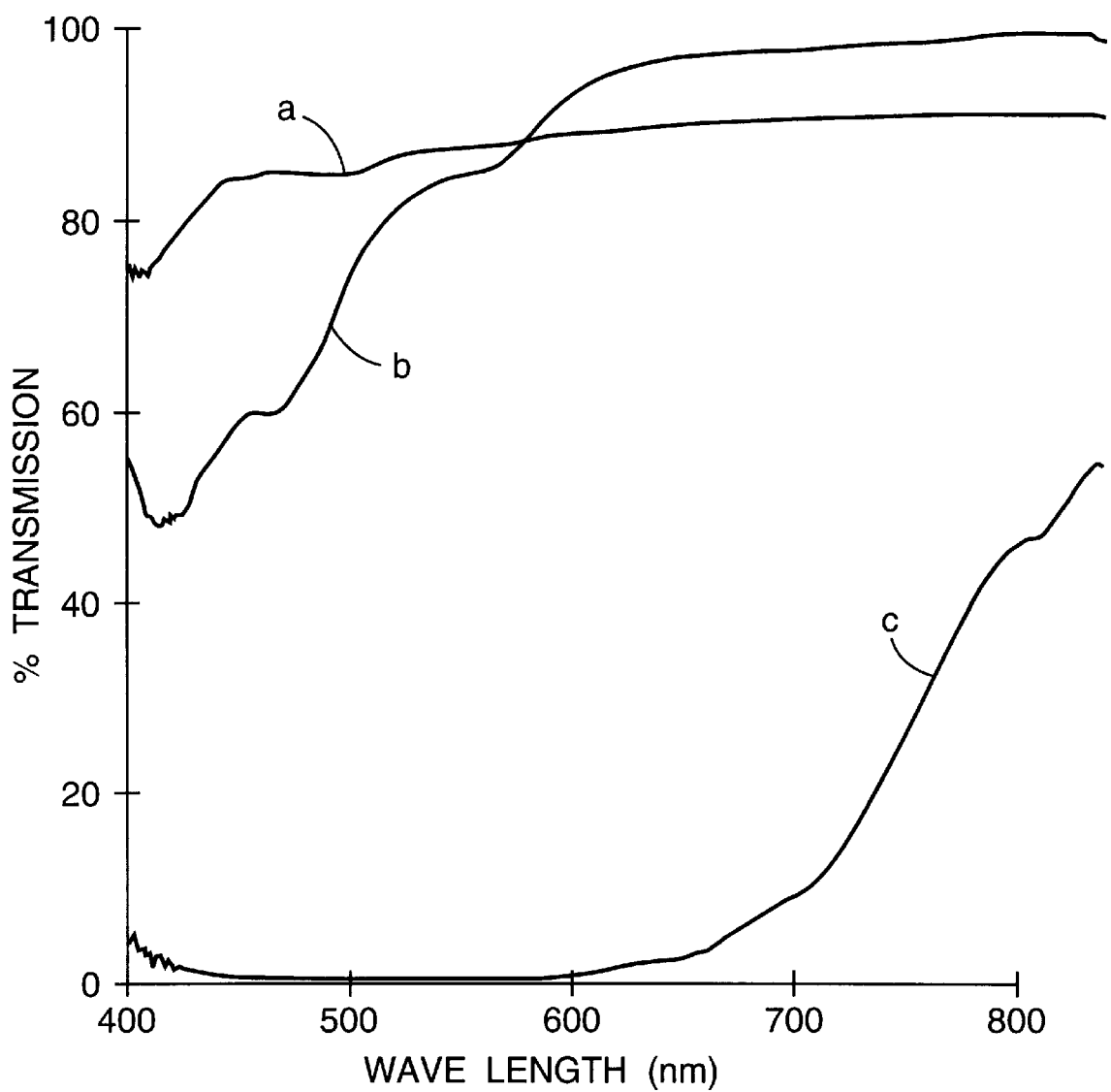

FIG. 28 shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high extinction of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 12

PET:Ecdel, 601, Mirror

A coextruded film containing 601 layers was made on a sequential flat-film-making line via a coextrusion process. A Polyethylene terephthalate (PET) with an Intrinsic Viscosity of 0.6 dl/g (60 wt. % phenol/40 wt. % dichlorobenzene) was delivered to the feedblock at a rate of 75 pounds per hour and Ecdel 9967 (a thermoplastic elastomer available from Eastman Chemical) was delivered at a rate of 60 pounds per hour. The PET was on the skin layers. The feedblock method was used to generate 151 layers which was passed through two multipliers producing an extrudate of 601 layers. The multipliers had a nominal multiplication ratio of 1.2 (next to feedblock) and 1.27. Two skin layers at a total throughput of 24 pounds per hour were added symmetrically between the last multiplier and the die. The skin layers were composed of PET and were extruded by the same extruder supplying the PET to the feedblock. The web was length oriented to a draw ratio of about 3.3 with the web temperature at about 205° F. The film was subsequently preheated to about 205° F. in about 35 seconds and drawn in the transverse direction to a draw ratio of about 3.3 at a rate of about 9% per second. The film was then relaxed about 3% of its maximum width in a heat-set oven set at 450° F. The finished film thickness was about 0.0027 inches.

Figure 29:
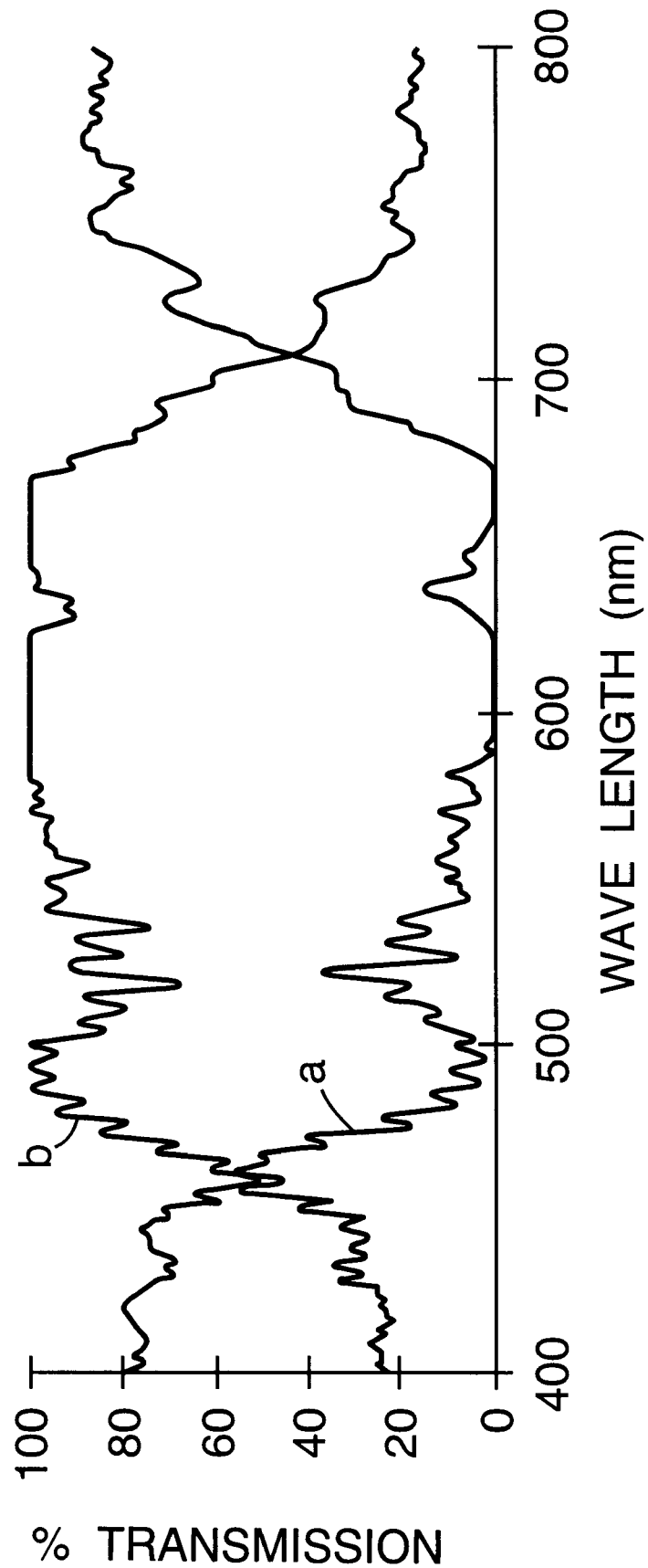
FIG. 29 shows optical performance of the multilayer mirror given in Example 12.

The film provided the optical performance as shown in FIG. 29. Transmission is plotted as curve a and reflectivity is plotted as curve b. The luminous reflectivity for curve b is 91.5%.

EXAMPLE 13

PEN:CoPEN, 601, Antireflected Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 30% dimethyl terephthalate with ethylene glycol. The feedblock method was used to generate 151 layers. The PEN skin layers were coextruded on the outside of the optical stack with a total thickness of 8% of the coextruded layers. The feedblock was designed to make a linear gradient in layer thickness for a 149 layer optical stack with the thinnest layers on one side of the stack. The individual layer thicknesses were designed in pairs to make equal thickness layers of the PEN and coPEN for each pair. Each pair thickness, d, was determined by the formula $d=d_o+d_o*0.003*n$, where $d_o$ is the minimum pair thickness, and n is the pair number between 1 and 75. The optical stack was multiplied by two sequential multipliers. The nominal multiplication ratio of the multipliers were 1.2 and 1.27, respectively. The film was subsequently preheated to 320° F. in about 40 seconds and drawn in the transverse direction to a draw ratio of about 5.0 at a rate of 6% per second. The finished film thickness was about 2 mils.

A silical sol gel coating was then applied to one side of the reflecting polarizer film. The index of refraction of this coating was approximately 1.35. Two pieces of the AR coated reflecting polarizer film were cut out and the two were laminated to each other with the AR coatings on the outside. Transmission spectra of polarized light in the crossed and parallel directions were obtained. The sample was then rinsed with a 2% solution of ammonium bifluoride (NH4 HF2) in deionized water to remove the AR coating. Spectra of the bare multilayer were then taken for comparison to the coated sample.

Figure 30:
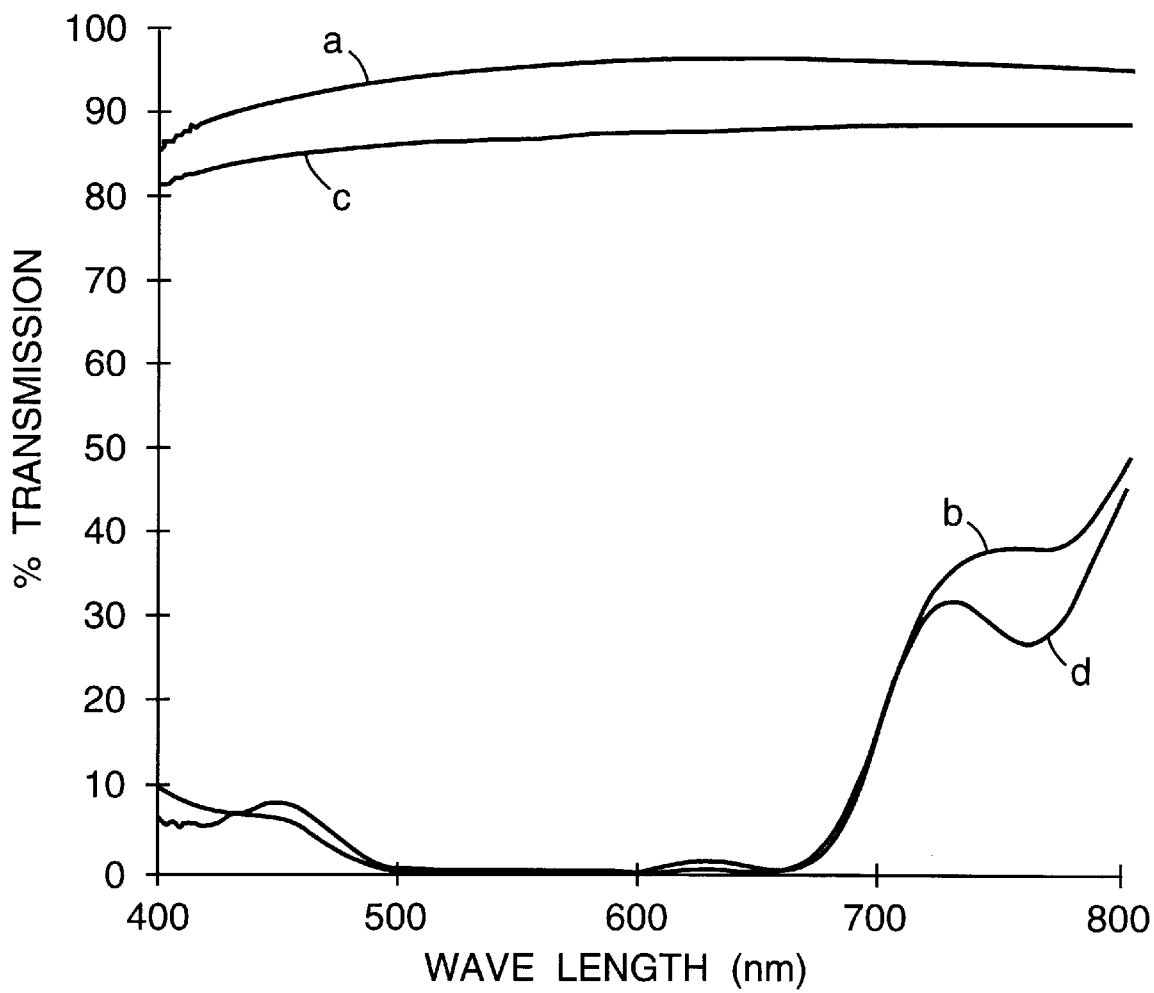
FIG. 30 shows optical performance of the AR coated polarizer given in Example 13.

FIG. 30 shows the spectra of the coated and uncoated polarizer. Curves a and b show the transmission and extinction, respectively, of the AR coated reflecting polarizer, and curves c and d show the transmission and extinction, respectively, of the uncoated reflecting polarizer. Note that the extinction spectrum is essentially unchanged, but that the transmission values for the AR coated polarizer are almost 10% higher. Peak gain was 9.9% at 565 nm, while the average gain from 425 to 700 nm was 9.1%. Peak transmission of the AR coated polarizer was 97.0% at 675 nm. Average transmissions for curve a over 400–700 nm was 95.33%, and average transmission for curve d over 400–700 nm was 5.42%.

EXAMPLE 14

PET:Ecdel, 601, Polarizer

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to a feedblock by one extruder at a rate of 75 pounds per hour and Ecdel 9967 (a thermoplastic elastomer available from Eastman Chemical) was delivered to the feedblock by another extruder at a rate of 60 pounds per hour. The PET was on the skin layers. The feedblock method was used to generate 151 layers which passed through two multipliers (2x) producing an extrudate of 601 layers. A side stream with a throughput of 50 pounds per hour was taken from the PET extruder and used to add two skin layers between the last multiplier and the die. The web was length oriented to a draw ratio of about 5.0 with the web temperature at about 210° F. The film was not tentered. The finished film thickness was about 2.7 mil.

Figure 31:
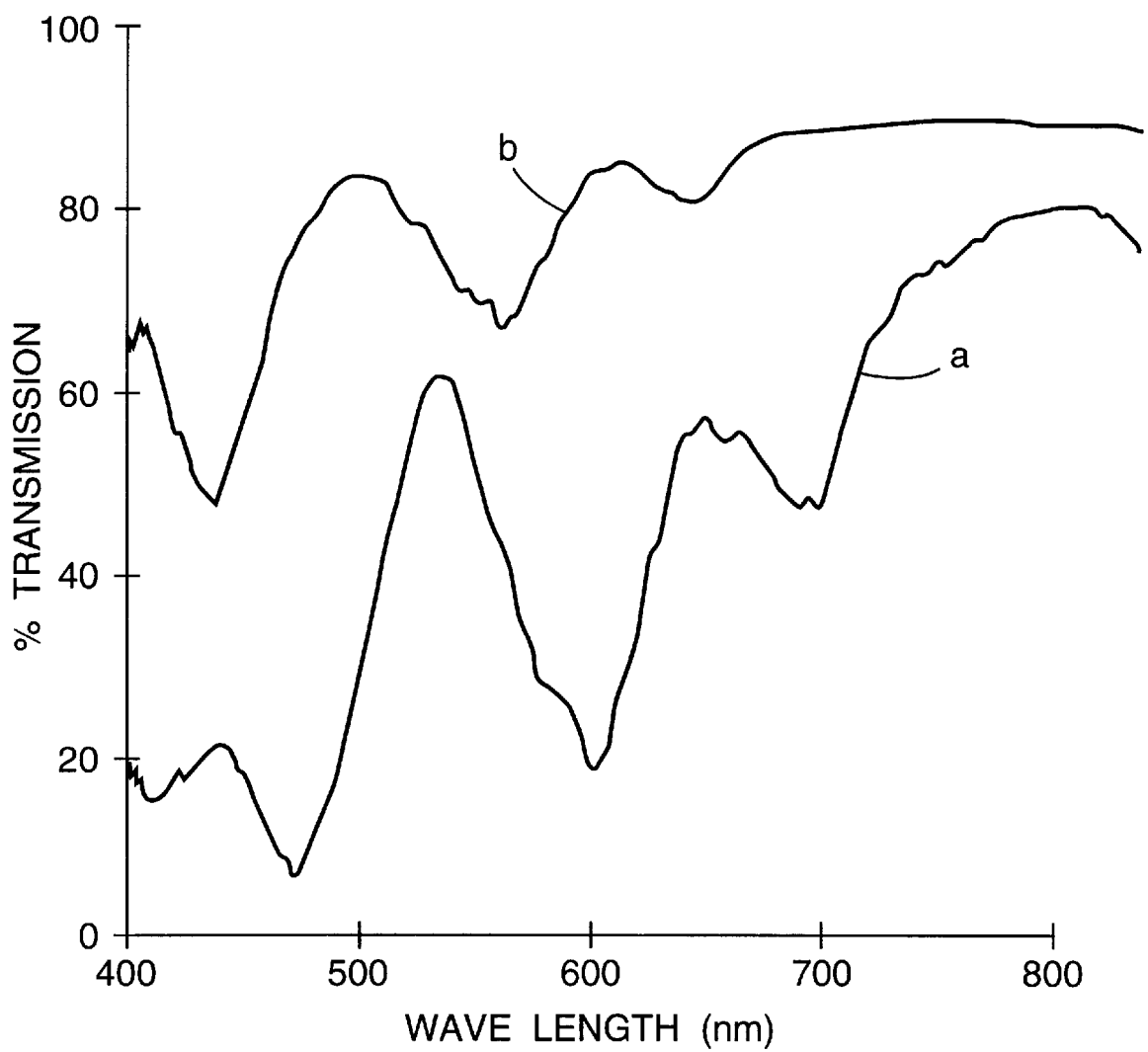
FIG. 31 shows optical performance of the polarizer given in Example 14.

FIG. 31 shows the transmission for this film. Curve a shows the transmission of light polarized in the stretch direction, while curve b shows the transmission of light polarized orthogonal to the stretch direction. The average transmission from 400–700 nm for curve a is 39.16%.

EXAMPLE 15

PEN:CoPEN, 449, Polarizers

A coextruded film containing 449 layers was made by extruding the cast web in one operation and later orienting the film in a laboratory film-stretching apparatus. A polyethylene naphthalate (PEN) with an Intrinsic Viscosity of 0.53 dl/g (60 wt. % phenol/40 wt. % dichlorobenzene) was delivered by one extruder at a rate of 26.7 pounds per hour to the feedblock and a different material was delivered by second extruder at a rate of 25 pounds per hour to the feedblock. The PEN was the skin layers. The feedblock method was used to generate 57 layers which passed through three multipliers producing an extrudate of 449 layers. The cast web was 0.0075 mils thick and 12 inches wide. The web was later uniaxially oriented using a laboratory stretching device that uses a pantograph to grip a square section of film and stretch it in one direction at a uniform rate while it is constrained in the other. A 7.46 cm square of web was loaded into the stretcher at about 100° C. and heated to 140° C. for 60 seconds. Stretching then commenced at 10%/sec (based on original dimensions) until the sample was stretched to about 5.5x1. Immediately after stretching, the sample was cooled by blowing room temperature air at it.

The input to the second extruder was varied by blending pellets of the following poly(ethylene esters) three materials: (i) a CoPEN (70 mol % 2,6-napthalene dicarboxylate and 30 mol % terephthalate) with an intrinsic viscosity of 0.52 (60 wt. % phenol/40 wt. % dichlorobenzene); (ii) the PEN, same material as input to first extruder; (iii) a PET, with an intrinsic viscosity of 0.95 (60 wt. % phenol/40 wt. % dichlorobenzene). TTF 9506 purchased from Shell.

Figure 32A:
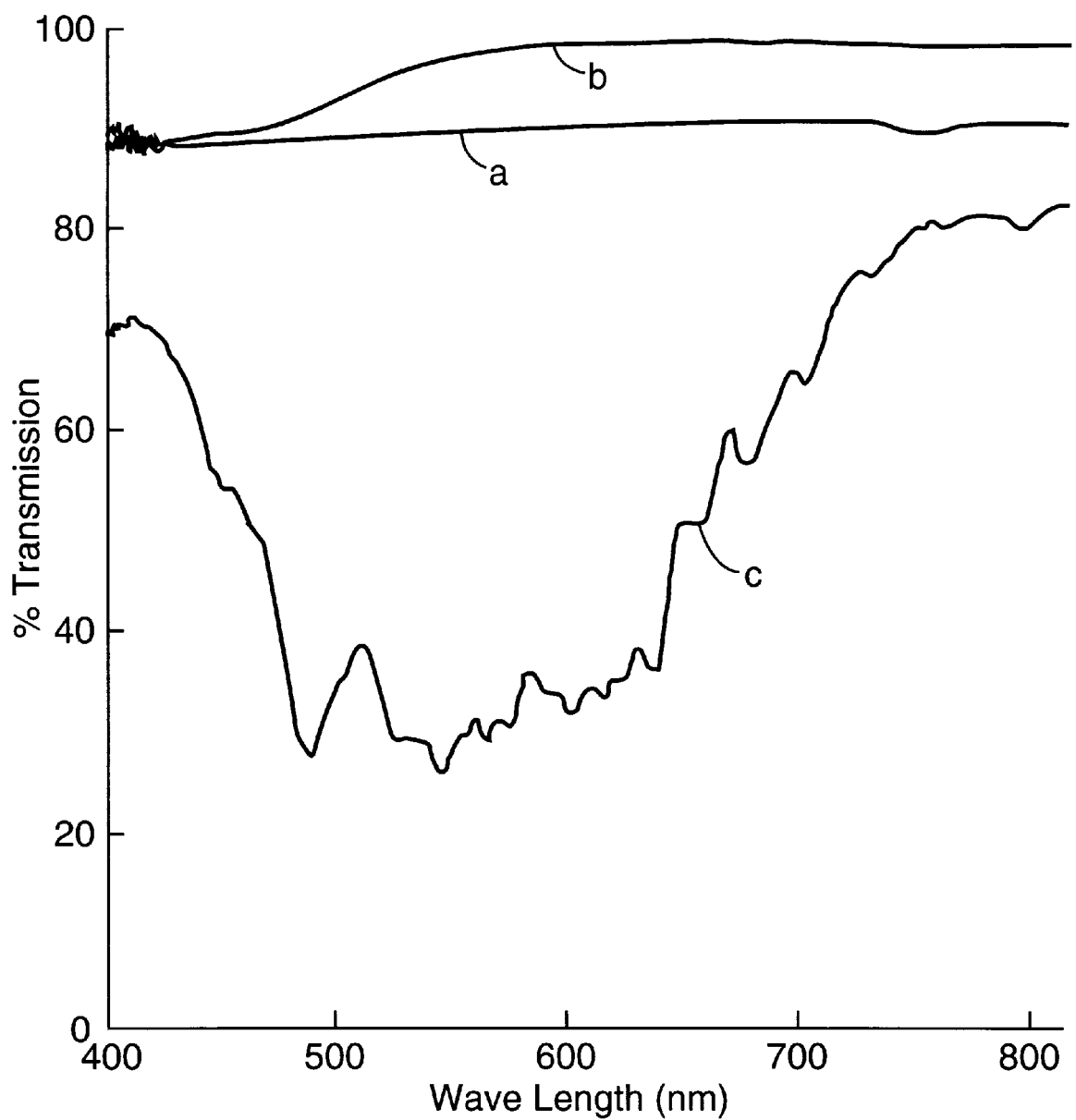
FIGS. 32A, 32B and 32C show optical performance of multilayer polarizers given in Example 15.
Figure 32B:
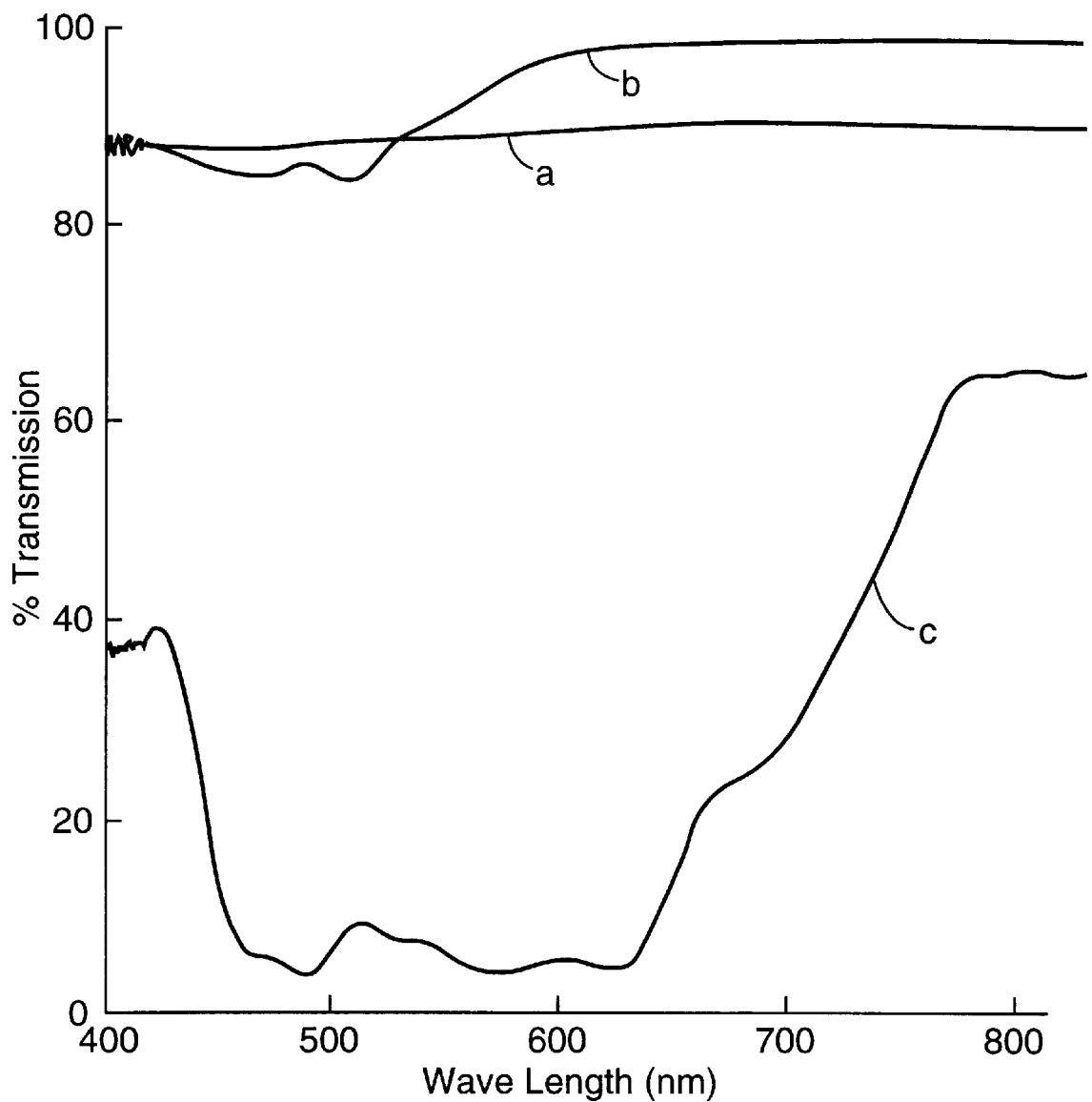
Figure 32C:
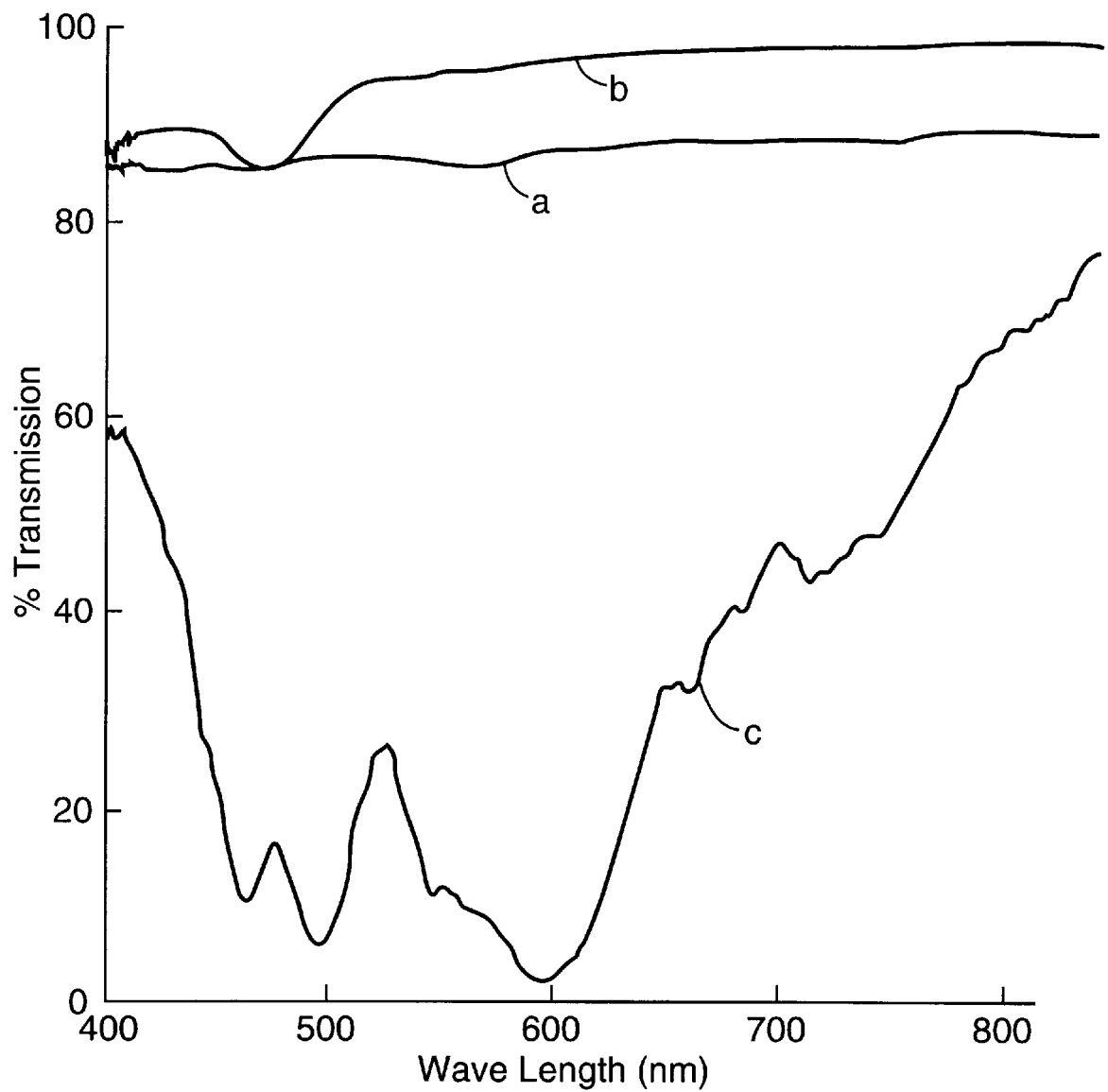

For the film shown in FIG. 32A the input to the second extruder was 80 wt % of the CoPEN and 20 wt % of the PEN; for the film shown in FIG. 32B the input to the second extruder was 80 wt % of the CoPEN and 20 wt % of the PET; for the film shown in FIG. 32C the input to the second extruder was CoPEN.

FIGS. 32A, 32B, and 32C show the transmission of these multilayer films where curve a shows transmission of light polarized in the non-stretch direction at normal incidence, curve b shows transmission of p-polarized light polarized in the non-stretched direction at 60° incidence, and curve c shows transmission of light polarized in the stretch direction at normal incidence. Note that the optical response of these films is sensitive to the chemical composition of the layers from the second extruder. The average transmission for curve c in FIG. 32A is 43.89%, the average transmission for curve c in FIG. 32B is 21.52%, and the average transmission for curve c in FIG. 32C is 12.48%. Thus, extinction is increased from FIG. 32A to FIG. 32C.

For the examples using the 57 layer feedblock, all layers were designed for only one optical thickness (¼ of 550 nm), but the extrusion equipment introduces deviations in the layer thicknesses throughout the stack resulting in a fairly broadband optical response. For examples made with the 151 layer feedblock, the feedblock is designed to create a distribution of layer thicknesses to cover a portion of the visible spectrum. Asymmetric multipliers were then used to broaden the distribution of layer thicknesses to cover most of the visible spectrum as described in U.S. Pat. Nos. 5,094,788 and 5,094,793.

EXAMPLE 16

PEN:sPS, 481, Reflective/Dichroic Polarizer

A coextruded film containing 481 layers was made from 2,6-polyethlyne naphthalate purchased from Eastman Chemicals with an intrinsic viscosity of 0.56 dl/g measured in 60 wt % phenol and 40 wt % dichlorobenzene, and a syndiotactic polystyrene homopolymer (weight average molecular weight of 200,000 Daltons, sampled from Dow Corporation. The PEN was the outer layers and was extruded at 26 pounds per hour and the sPS was extruded at 23 pounds per hour. The feedblock used produced 61 layers with each of the 61 layers being approximately the same thickness. After the feedblock, three, 2x multipliers were used. U.S. Pat. No. 3,565,985 describes similar multipliers. Equal thickness skin layers containing the same 2,6-polyethylene naphthalate fed to the feedblock were added after the final multiplier at a total rate of 22 pounds per hour. The web was extruded through a 12" wide die to a thickness of about 0.01 inches (0.276 mm). The extrusion temperature was 296 degrees C.

The cast web was coated at about 2 feet per minute using a doctor blade with a 1 mil gap with a primer layer of 4.8% sulfopolyester WB 50 and 0.1% Triton X100 in water. This was dried for 2 minutes at 50 degrees C. in a forced air oven, then coated at about 2 feet pre minute with a doctor blade with a 2 mil gap with a solution of about 200 grams of Air Products #107 polyvinyl alcohol in 1.1 liters of deionized water. The film was dried for 5 minutes in a 50 degree C. forced air oven. The coated web was uniaxially oriented using a laboratory stretching device that uses a pantograph to grip a 7.46 cm square section of the coated cast film. The sides of the film were constrained during stretching. The sample was loaded into the stretcher at 100 degrees C. and heated to 120 degrees C. in 60 seconds. The film was stretched in one direction at about 10% per second (based on the original dimension). The final stretch ratio was about 5.5 to 1. Immediately after stretching the sample was cooled by blowing room temperature air on it. The finished film thickness was about 2.0 mils for the reflective polarizer, and 0.3 mil for the dichroic polarizer. The multilayer film and the coating has sufficient adhesion to allow orientation without delamination. The coated, oriented film was stained for 20 seconds in a 35 degree C. solution of 0.4% iodine and 21% potassium iodide in deionized water. The film was removed from the solution, the excess allowed to drain, and then placed into a 65 degree C. solution of 5% boric acid and 15% borax in water for 60 seconds. The sample was then dried in air at room temperature.

The optical characteristics of the sample was measured with a Perkin-Elmer Lambda 19 using an integrating sphere attachment. The reflectivity of the coated reflective polarizer from the reflective polarizer side was (averaged from 400 to 700 nm) 8.2% for the transmitted polarization and 98.5% for the reflected polarization. Average reflectivity from the dichroic polarizer side was 7.5% for the high absorption polarization and 4.7% for the transmitted polarization. Average transmission for the high transmission polarization was 74.6%, and for the high extinction polarization, 0.58%.

Synthesis of Sulfopolyester WB 50: A one gallon polyester kettle was charged with 111.9 g (5.5 mole %) sodiosulfoisophthalic acid, 592.1 g (47.0 mole %) terephthalic acid, 598.4 g (47.5 mole %) isophthalic acid, 705 g ethyleneglycol, 59.9 g neopentyl glycol, 0.7 g antimony oxide, and 2.5 g sodium acetate. The mixture was heated with stirring to 230 C. at 50 psi under nitrogen for 2 hours, during which time water evolution was observed. The temperature was increased to 250 C. and the pressure was then reduced, vacuum applied (0.2 Torr), and the temperature increased to 270 C. The viscosity of the material increased over a period of 45 minutes, after which time a high molecular weight, clear, visous sulfopolyester was drained. This sulfopolyester was found by differential scanning calorimetry to have a Tg of 70.3 C. The theoretical sulfonate equivalent weight was 3847 g polymer per mole of sulfonate. 500 g of polymer was dissolved in a mixture of 2000 g water and 450 g isopropanol at 80 C. The temperature was then raised to 95 C. in order to remove the isopropanol (and a portion of the water), yielding a 22% solids aqueous dispersion.

Although the preferred reflective polarizer body 12 has been described as a multilayer stack of polymeric materials, it shall be understood that other reflective polarizers could be substituted therefore without departing from the scope of the present invention. Other reflective polarizers include cholesteric liquid crystal polarizers using an optical retarder placed between the reflective polarizer and dichroic polarizer, tilted optic prismatic and non-prismatic multilayer polarizers, and first-order diffractive polarizers.

Thus, although the present optical polarizer has been described with reference to the preferred embodiment, those skilled in the art will readily appreciate that other embodiments may be utilized and changes made in form and detail without departing from the spirit and scope of the present invention.

We claim:

1. A method for manufacturing a polarizer, comprising the steps of:

providing a reflective polarizer film including a polymeric material that becomes birefringent upon stretching;

coating polyvinyl alcohol onto the reflective polarizer film; and stretching the coated reflective polarizer film to orient both the polymeric material of the reflective polarizer film and the polyvinyl alcohol.

2. A method as recited in claim 1, further comprising the step of staining the oriented polyvinyl alcohol.

3. A method as recited in claim 2, wherein the polyvinyl alcohol is stained using a dye based staining solution.

4. A method as recited in claim 1, further comprising the step of priming the reflective polarizer film prior to coating the polyvinyl alcohol to improve adhesion of the polyvinyl alcohol to the reflective polarizing film.

5. A method as recited in claim 1, wherein the reflective polarizer film further comprises a second polymeric material.

6. A method as recited in claim 5, wherein the reflective polarizer film comprises alternating layers of the birefringent material and the second material.

7. A method as recited in claim 5, wherein the second material is isotropic.

8. A method as recited in claim 4, wherein the stretching step is performed at a temperature above the glass transition temperature of at least one of the birefringent material and the second material.

9. A method as recited in claim 1, wherein the polyvinyl alcohol is continuously coated onto a cast web of the reflective polarizer film.

10. A method as recited in claim 7, wherein the stretching step comprises the step of stretching the coated web of the reflective polarizer in the cross-web direction using a tenter.

11. A method as recited in claim 1, wherein the stretching step is performed at a temperature sufficient to orient the polyvinyl alcohol and induce birefringence in the birefringent material.

12. A method as recited in claim 1, wherein the stretching step comprises the step of stretching the coated reflective polarizer film in a first direction while allowing the coated reflective polarizer film to dimensionally relax in a second direction.

13. A method as recited in claim 1 where in the stretching step is performed at a temperature between 100 and 160° C.

14. A method as recited in claim 1 wherein the coated reflective polarizer film is stretched from 3 to 6 times its dimension prior to stretching.

15. A polarizer manufactured according to the process of claim 1.

16. A display incorporating the polarizer of claim 1.

17. A display as recited in claim 16, further comprising an optical cavity wherein the polarizer is laminated to the optical cavity.

18. A display as recited in claim 16, further comprising an optical cavity and a display module, the polarizer being disposed between the optical cavity and the display module.

19. A display as recited in claim 18, wherein the polarizer is disposed as a rear polarizer in a transmissive display.

20. A method for manufacturing a polarizer comprising the step of simultaneously stretching a film having a first material which becomes birefringent upon stretching to form a reflective polarizer and a second material used to form a dichroic polarizer.

21. A method as recited in claim 20, wherein the second material comprises polyvinyl alcohol.

* * * * *

UNITED STATES PATENT AND TRADEMARK OFFICE
CERTIFICATE OF CORRECTION

PATENT NO. : 6,096,375
DATED : August 1, 2000
INVENTOR(S) : Andrew J. Ouderkirk, Michael F. Weber, James M. Jonza, Carl A. Stover It is certified that error appears in the above-identified patent and that said Letters Patent is hereby corrected as shown below:

Title page,
Other Publications, 3rd Reference, Weber, M., "(1993)" should read -- (1992) --

Column 28,
Line 44, "pre" should read -- per --

Column 30,
Line 15, "(4)" should read -- 5 --
Line 22, "(7)" should read -- 9 --
Line 41, "(1)" should read -- 15 --

Signed and Sealed this

Sixth Day of November, 2001

Attest:

NICHOLAS P. GODICI
Attesting Officer    Acting Director of the United States Patent and Trademark Office